United States Patent
Noda et al.

(10) Patent No.: US 8,514,504 B2
(45) Date of Patent: Aug. 20, 2013

(54) IMAGE PICKUP LENS, IMAGE PICKUP APPARATUS, AND PORTABLE TERMINAL DEVICE

(75) Inventors: Takayuki Noda, Saitama (JP); Takashi Suzuki, Saitama (JP); Kazunori Ohno, Saitama (JP)

(73) Assignee: Fujifilm Corporation, Tokyo (JP)

( * ) Notice: Subject to any disclaimer, the term of this patent is extended or adjusted under 35 U.S.C. 154(b) by 63 days.

(21) Appl. No.: 13/160,019

(22) Filed: Jun. 14, 2011

(65) Prior Publication Data
US 2011/0304759 A1    Dec. 15, 2011

(30) Foreign Application Priority Data
Jun. 15, 2010    (JP) .................................. 2010-135864

(51) Int. Cl.
*G02B 9/06*    (2006.01)
*G02B 9/04*    (2006.01)

(52) U.S. Cl.
USPC ......................................... 359/794; 359/793

(58) Field of Classification Search
USPC .................... 359/717, 739, 793–795
See application file for complete search history.

(56) References Cited

U.S. PATENT DOCUMENTS

| | | | |
|---|---|---|---|
| 5,071,235 A | 12/1991 | Mori et al. | |
| 5,701,207 A | 12/1997 | Waketa et al. | |
| 7,372,644 B2 | 5/2008 | Saito | |
| 7,535,660 B2 | 5/2009 | Saito | |
| 7,570,436 B2 | 8/2009 | Shyu et al. | |
| 2008/0239511 A1* | 10/2008 | Shyu | 359/717 |
| 2009/0091848 A1 | 4/2009 | Tang | |

FOREIGN PATENT DOCUMENTS

| | | |
|---|---|---|
| JP | 2005-284003 | 10/2005 |
| JP | 2006-208826 | 8/2006 |
| JP | 2008-040413 | 2/2008 |
| JP | 2008-152004 | 7/2008 |
| JP | 2009-075437 | 4/2009 |

\* cited by examiner

*Primary Examiner* — William Choi
(74) *Attorney, Agent, or Firm* — Young & Thompson

(57) ABSTRACT

An image pickup lens includes a first lens having a positive meniscus shape convex toward an object side, a second lens disposed on an image side of the first lens and has a meniscus shape convex toward the image side, and an aperture stop disposed on the object side of the image side surface of the first lens, and satisfies conditional expressions given below, in which f is a focal length of the entire system, R2 is a paraxial radius of curvature of the object side of the first lens, R3 is a paraxial radius of curvature of the image surface of the first lens, and DD is a distance on the optical axis between the first and second lenses: $0.45 < R2/R3 < 0.66$; and $0.05 < DD/f \leq 0.117$.

10 Claims, 13 Drawing Sheets

EXAMPLE 1

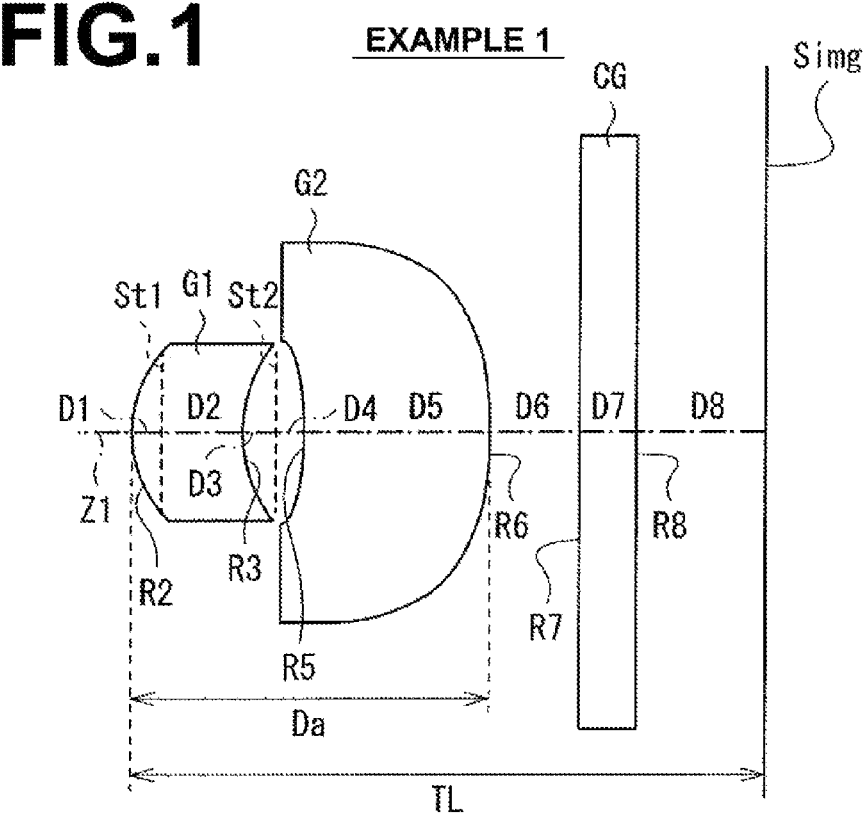
FIG.1  EXAMPLE 1
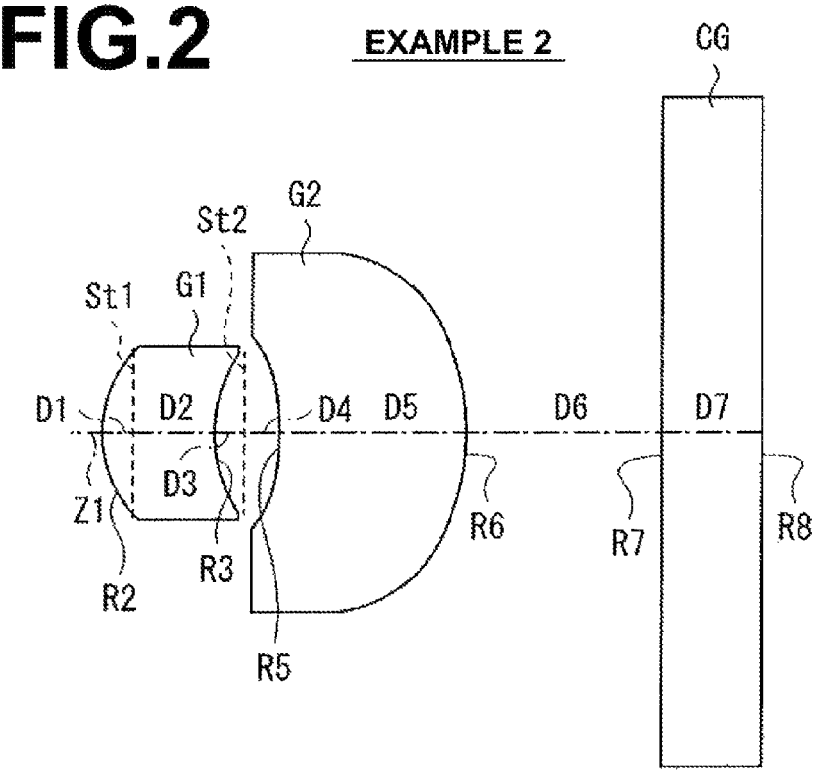
FIG.2  EXAMPLE 2

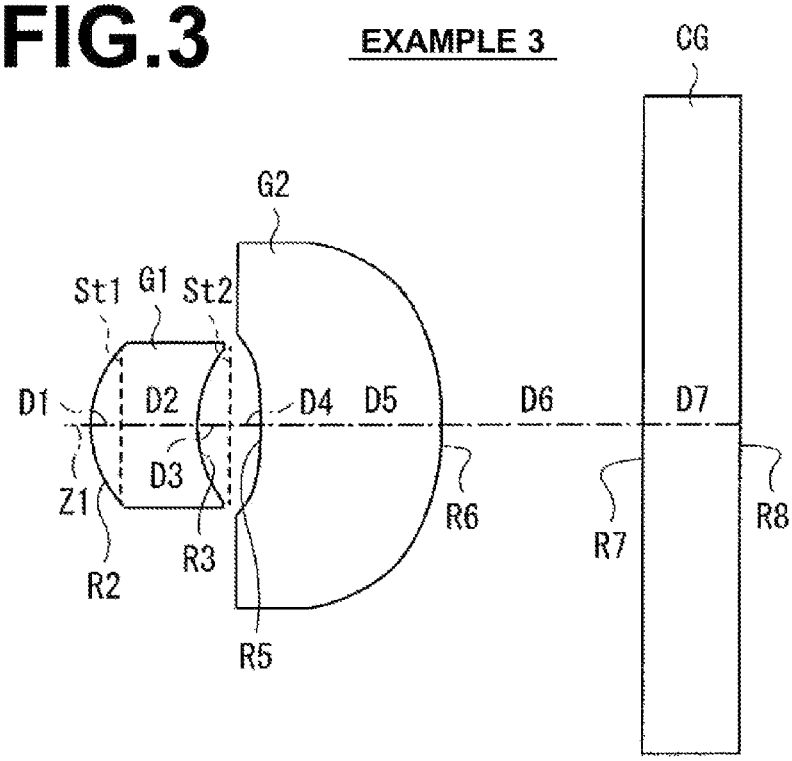
FIG.3 EXAMPLE 3
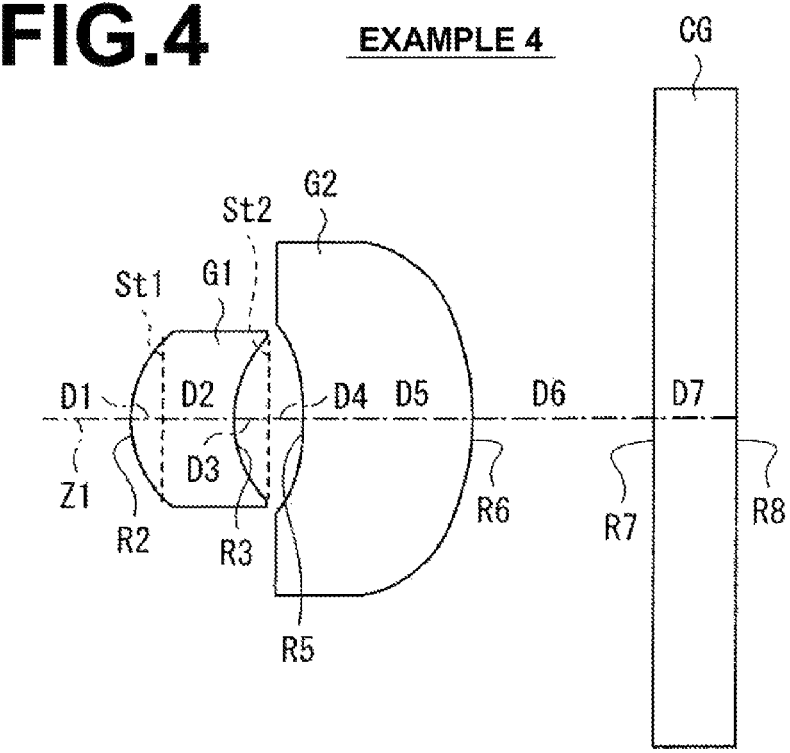
FIG.4 EXAMPLE 4

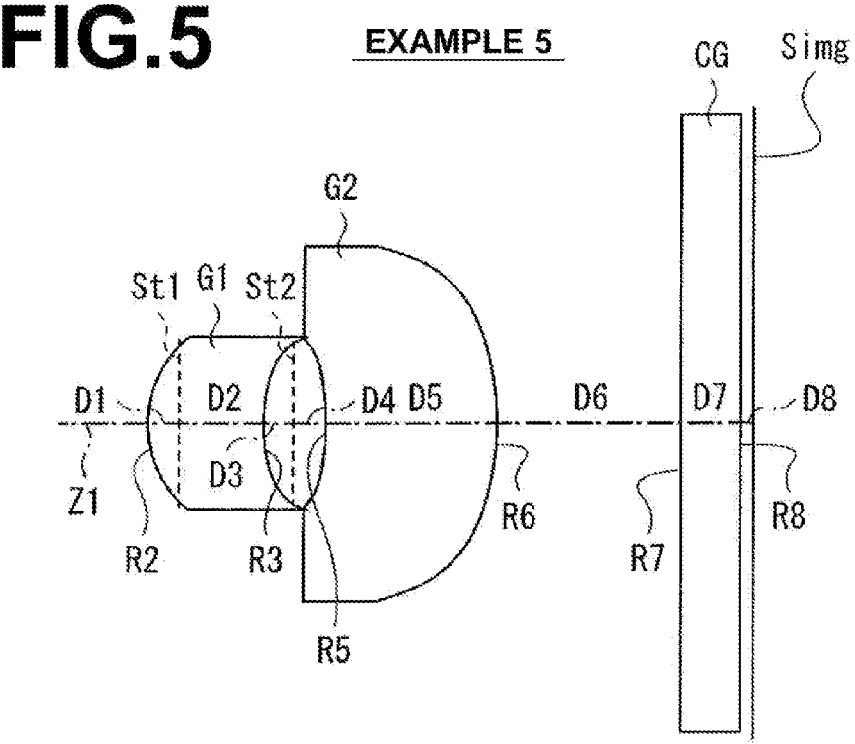
FIG.5    EXAMPLE 5
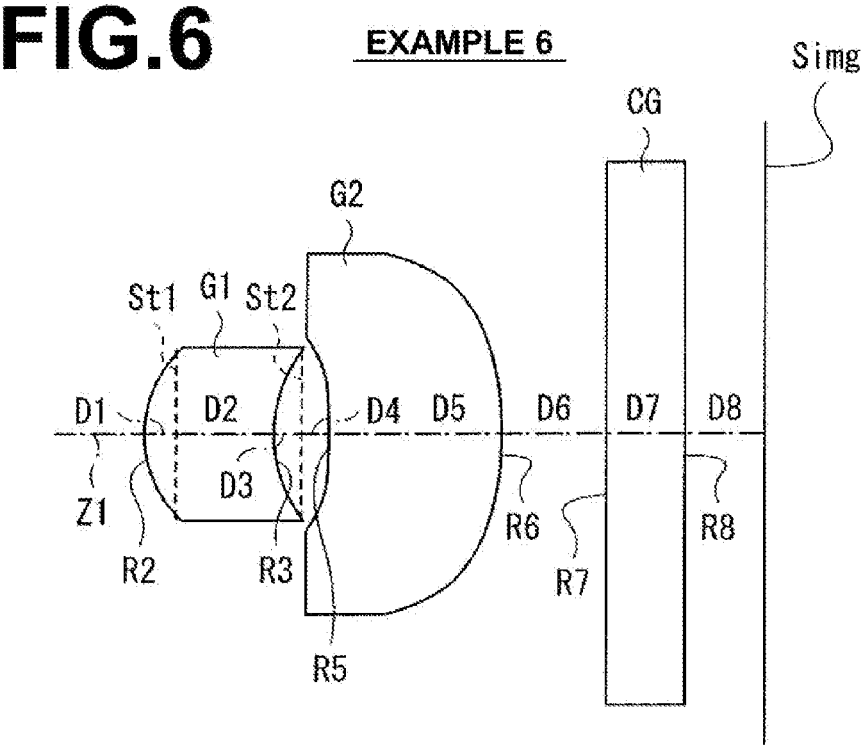
FIG.6    EXAMPLE 6

FIG.7 EXAMPLE 7
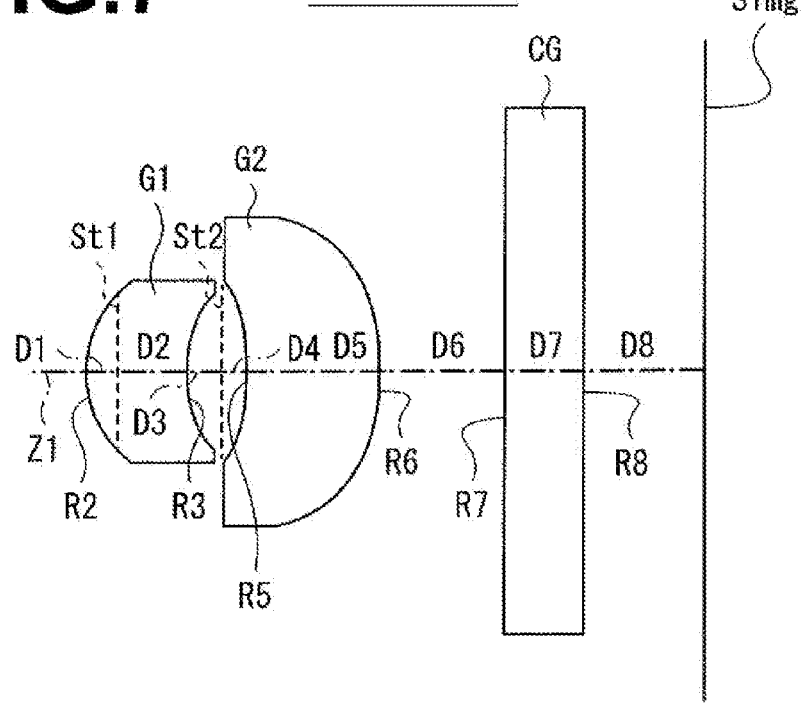
FIG.8 EXAMPLE 8
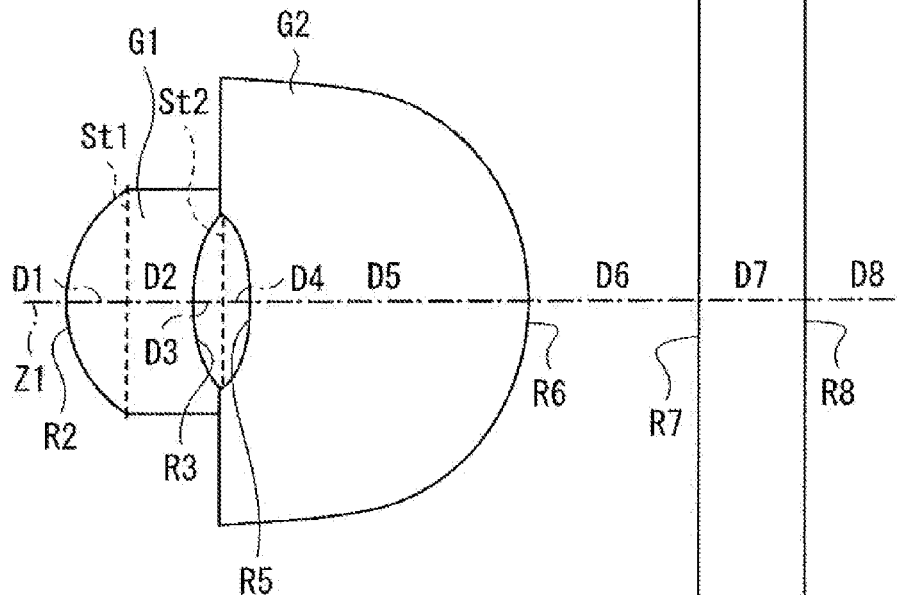

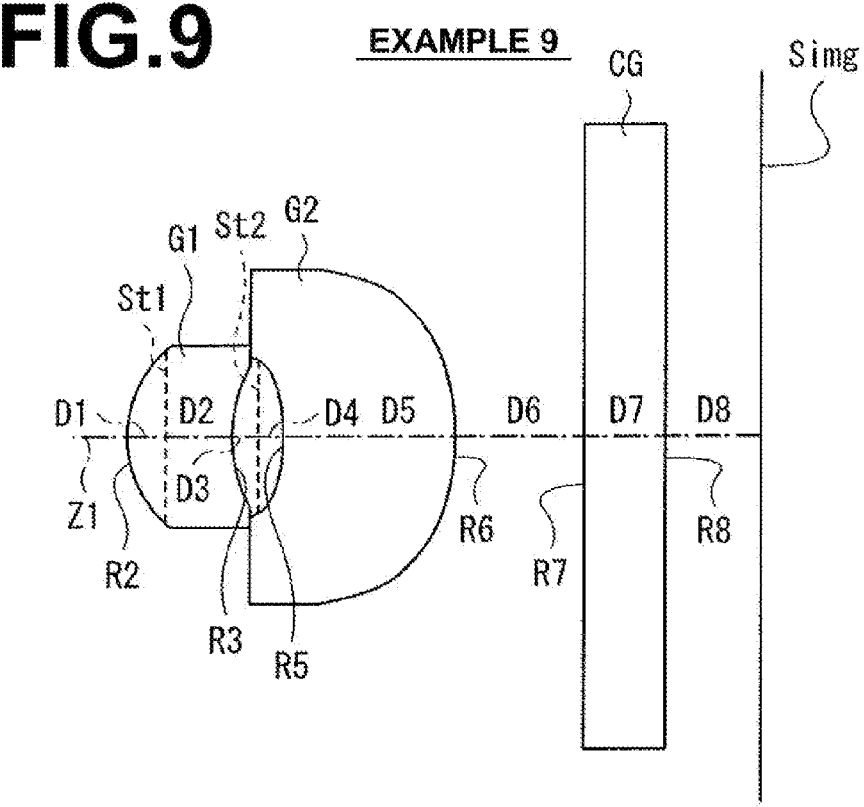
FIG.9 EXAMPLE 9
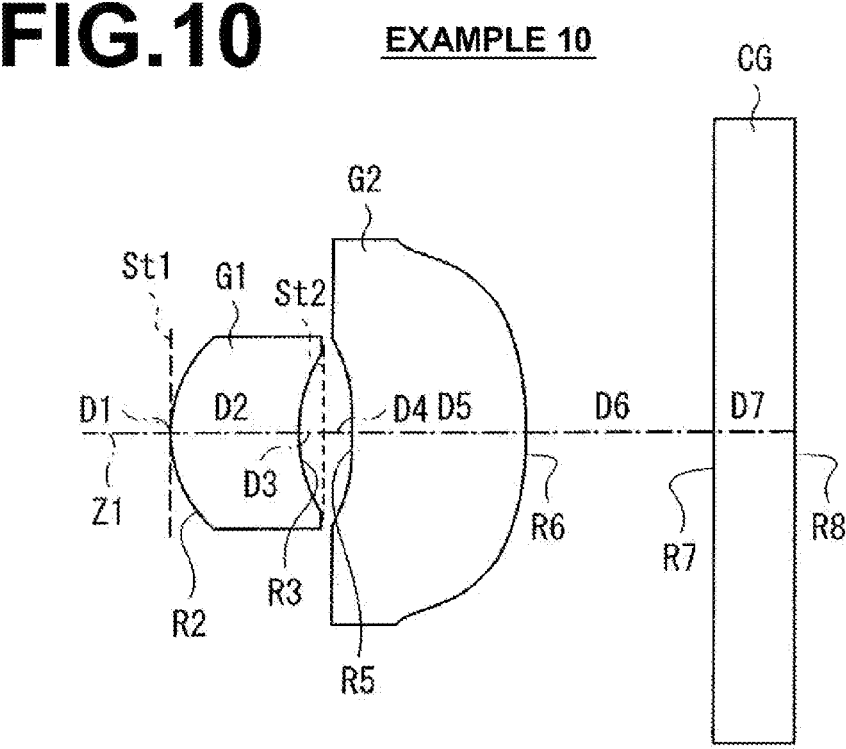
FIG.10 EXAMPLE 10

FIG.11
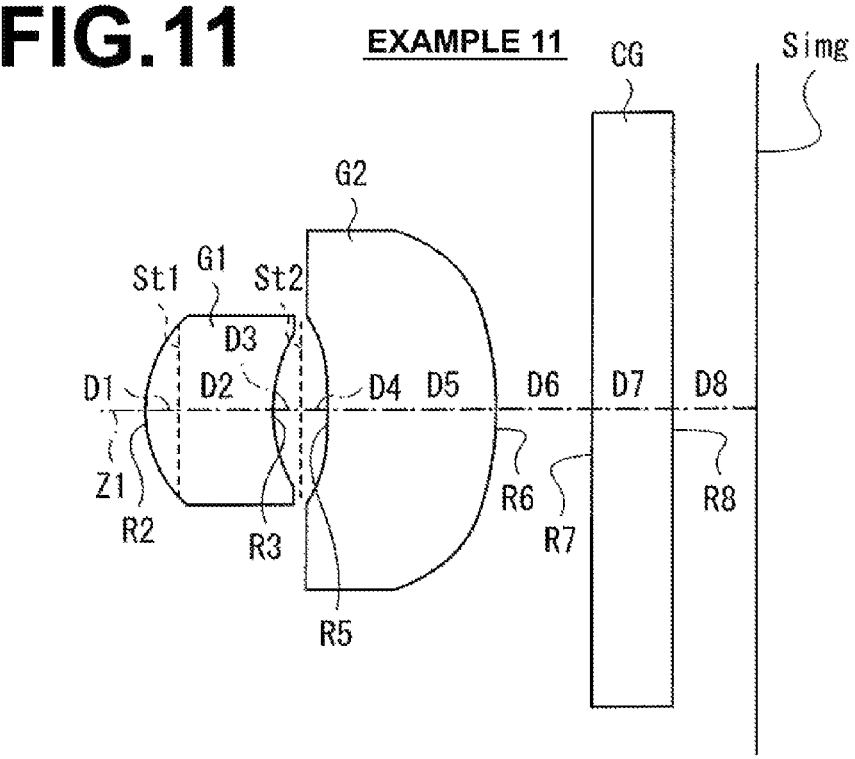
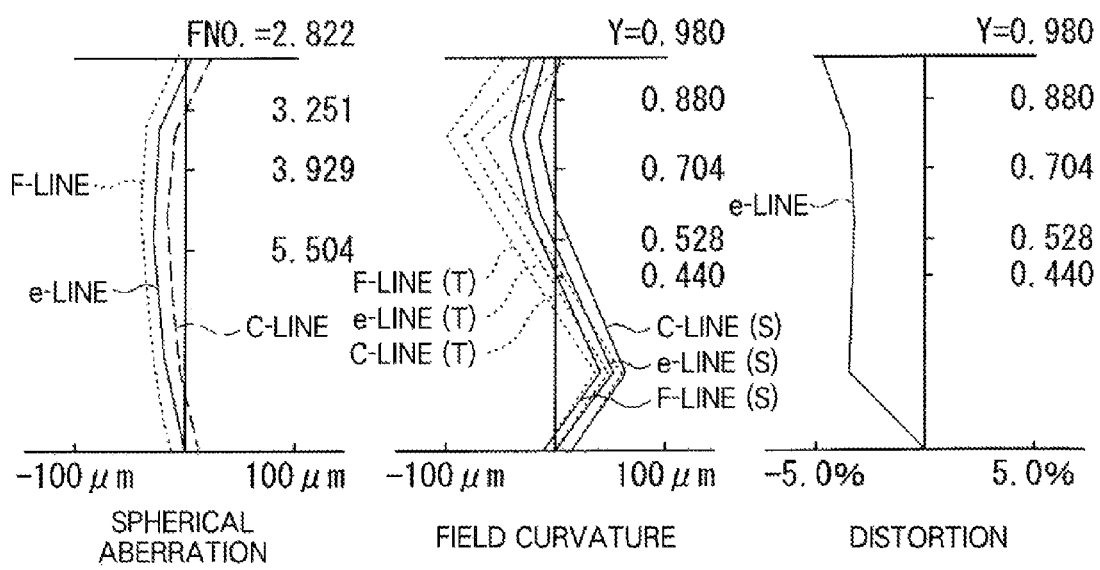
FIG.12A   FIG.12B   FIG.12C

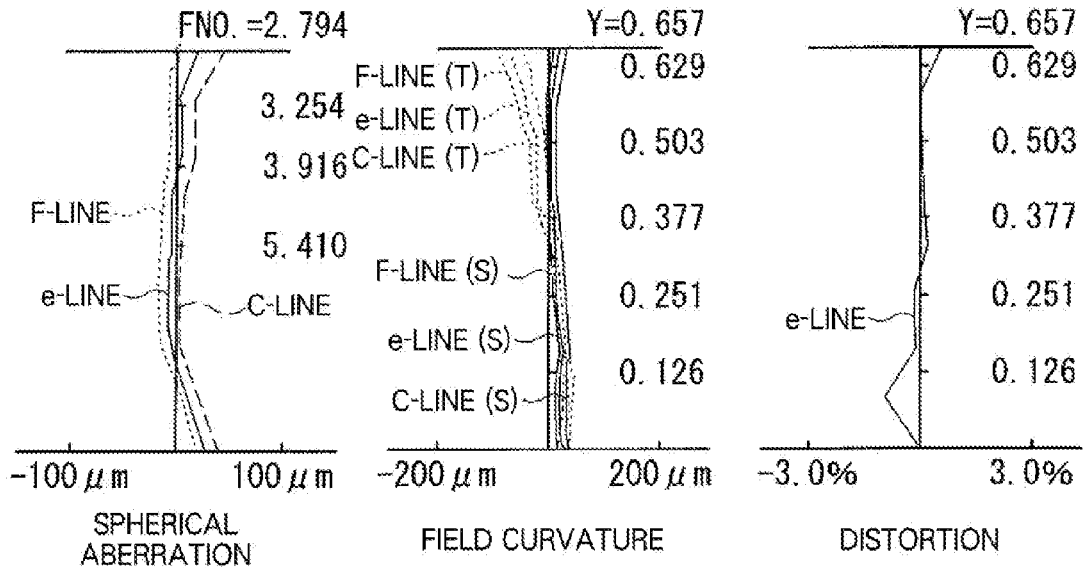
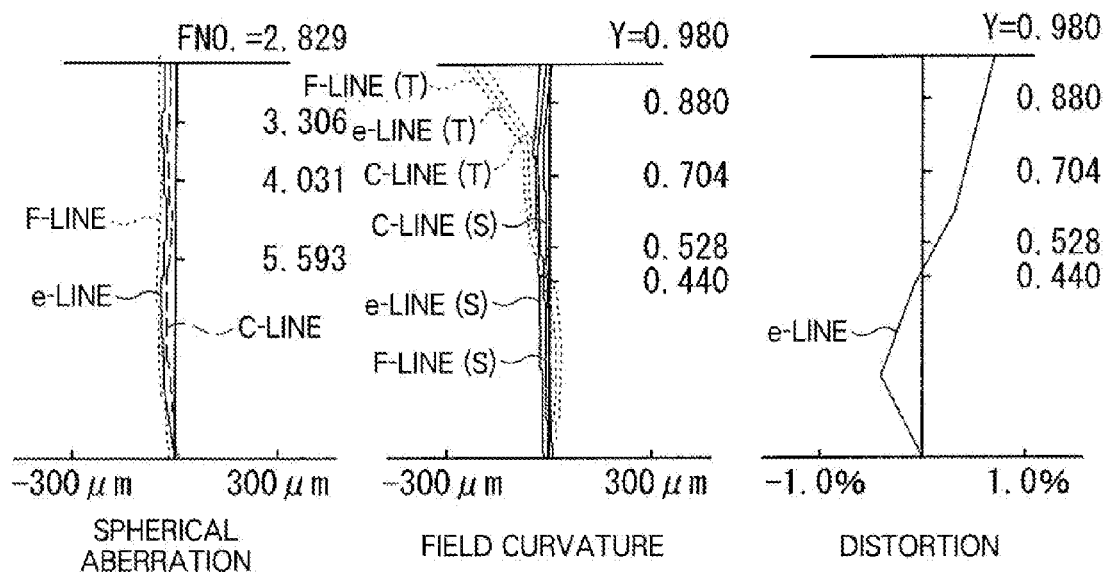

IMAGE PICKUP LENS, IMAGE PICKUP APPARATUS, AND PORTABLE TERMINAL DEVICE

BACKGROUND OF THE INVENTION

1. Field of the Invention

The present invention relates to an image pickup lens for forming an optical image of a subject on an image sensor, such as a CCD (charge coupled device), a CMOS (complementary metal oxide semiconductor), or the like, and an image pickup apparatus, such as a digital still camera or the like, having the image pickup lens mounted thereon to perform imaging. The invention also relates to a portable terminal device, such as a camera-equipped cell phone, a personal digital assistance (PDA), or the like.

2. Description of the Related Art

Recently, along with the spread of personal computers to homes and the like, digital still cameras capable of inputting image information obtained by imaging a landscape, a person, or the like to a personal computer have been spreading rapidly. In addition, more and more cell phones have built-in camera modules for image input. Such devices with imaging capabilities employ image sensors such as CCDs, CMOSs, and the like. In recent years, these types of image sensors have been downsized greatly and, consequently, imaging devices as a whole and image pickup lenses to be mounted on the devices have also been required to have more compact sizes. At the same time, the pixel count of image sensors has been increasing, thereby causing a growing demand for improvement of image pickup lenses in resolution and performance.

Image pickup lenses having a two lens configuration are disclosed, for example, in Japanese Unexamined Patent Publication No. 2005-284003, Japanese Unexamined Patent Publication No. 2006-208826, U.S. Pat. No. 7,535,660, Japanese Unexamined Patent Publication No. 2008-152004, and Japanese Unexamined Patent Publication No. 2009-075437.

As described above, downsizing and pixel count increase have been in progress for recent image sensors. For image pickup lenses of portable camera modules, in particular, cost reduction and compactness have been the major demands, but as the pixel count of image sensors even for portable camera modules tends to be increased, a demand for performance improvement is also growing. Consequently, development of wide variety of lenses comprehensively taking into account the cost, performance, and compactness is anticipated.

For example, an image pickup lens with a relatively wide viewing angle, a bright F-number of about 2.8, and a reduced total length is required. Consequently, it is demanded that the total lens length (distance from the most object side surface to the image plane) with respect to the focal length is reduced. In the mean time, if a lens comes too close to a sensor surface due to the recent downsizing of image sensors, dirt adhered to the surface of the lens affects largely on the light intensity variation, it is, therefore, necessary to secure a relatively long back focus as a countermeasure. Consequently, it has been anticipated that an image pickup lens formed of only two lenses, yet having a relatively wide viewing angle of, for example, 50 to 80 degrees in terms of horizontal angle of view, a bright F-number of about 2.8, a reduced total length, and a back focus of certain extent is developed. In order to deal with high pixel count image sensors, image pickup lenses are required to have telecentricity, that is, the incident angle of the chief ray becomes substantially parallel to the optical axis (incident angle on the image plane becomes close to zero with respect to normal line). Consequently, it is also required that the exit pupil position is set at a position remote from the imaging plane while the total length of the image pickup lens is reduced. Further, it is naturally demanded that various aberrations, including spherical aberration, distortion, chromatic aberration, and the like, are sufficiently corrected while the aforementioned requirements are satisfied.

Consequently, development of two lens image pickup lenses having higher performance than that of conventional two lens image pickup lenses has been sought. For example, the image pickup lenses described in Japanese Unexamined Patent Publication No. 2005-284003 and in Japanese Unexamined Patent Publication No. 2006-208826 have a problem that the total length is too long. The image pickup lens described in Japanese Unexamined Patent Publication No. 2008-040413 has a problem that the total length is too short having difficulty in ensuring the telecentricity. The image pickup lens described in Japanese Unexamined Patent Publication No. 2008-152004 has a problem that the back focus is too short and may cause light intensity variation. For the image pickup lens described in Japanese Unexamined Patent Publication No. 2009-075437, disclosure of specific lens data and aberration performance is insufficient.

The present invention has been developed in view of the circumstances described above, and it is an object of the present invention to provide an image pickup lens reduced in total length with a small number of two lenses while having advantages in ensuring wide angle of view, brightness, and back focus with high image forming performance. It is a further object of the present invention to provide an image pickup apparatus and a portable terminal device, each having the image pickup lens and being capable of obtaining a high resolution image pickup signal.

SUMMARY OF THE INVENTION

An image pickup lens according to a first aspect of the present invention is an image pickup lens, including a first lens having a positive meniscus shape convex toward an object side, a second lens disposed on an image side of the first lens and has a meniscus shape convex toward the image side, and an aperture stop disposed on the object side of the image side surface of the first lens, wherein the image pickup lens is configured to satisfy conditional expressions give below in which f is a focal length of the entire lens system, f1 is a focal length of the first lens, f2 is a focal length of the second lens, R5 is a paraxial radius of curvature of the object side surface of the second lens, and R6 is a paraxial radius of curvature of the image side surface of the second lens.

$$1.149 \leq f1/f < 1.50 \tag{1-1}$$

$$1.1 < f2/f1 < 3.9 \tag{2-1}$$

$$2.0 < (R5+R6)/(R5-R6) < 5.4 \tag{3-1}$$

An image pickup lens according to a second aspect of the present invention is an image pickup lens, including a first lens having a positive meniscus shape convex toward an object side, a second lens disposed on an image side of the first lens and has a meniscus shape convex toward the image side, and an aperture stop disposed on the object side of the image side surface of the first lens, wherein the image pickup lens is configured to satisfy conditional expressions give below in which R2 is a paraxial radius of curvature of the object side surface of the first lens, R3 is a paraxial radius of curvature of the image side surface of the first lens, R5 is a paraxial radius of curvature of the object side surface of the second lens, R6 is a paraxial radius of curvature of the image side surface of the second lens, and Nd1 is a refractive index of the first lens with respect to d-line.

$$2.0<(R5+R6)/(R5-R6)<5.4 \quad (3\text{-}1)$$

$$-30<(R2+R3)/(R2-R3)\leq-5.991 \quad (4\text{-}1)$$

$$0.7<R2/R3<1.2 \quad (5\text{-}1)$$

$$Nd1<1.6 \quad (6)$$

An image pickup lens according to a third aspect of the present invention is an image pickup lens, including a first lens having a positive meniscus shape convex toward an object side, a second lens disposed on an image side of the first lens and has a meniscus shape convex toward the image side, and an aperture stop disposed on the object side of the image side surface of the first lens, wherein the image pickup lens is configured to satisfy conditional expressions give below in which f is a focal length of the entire lens system, f1 is a focal length of the first lens, f2 is a focal length of the second lens, Da is a distance, on the optical axis, from the object side surface of the first lens to the image side surface of the second lens, TL is a distance, on the optical axis, from the object side surface of the first lens to an image plane, and DD is a distance, on the optical axis, between the first and second lenses.

$$1.1<f2/f1<45.0 \quad (2\text{-}2)$$

$$0.6<Da/f<0.85 \quad (7)$$

$$1.06<TL/f<1.40 \quad (8)$$

$$0.05<DD/f\leq0.117 \quad (9\text{-}2)$$

An image pickup lens according to a fourth aspect of the present invention is an image pickup lens, including a first lens having a positive meniscus shape convex toward an object side, a second lens disposed on an image side of the first lens and has a meniscus shape convex toward the image side, and an aperture stop disposed on the object side of the image side surface of the first lens, wherein the image pickup lens is configured to satisfy conditional expressions give below in which f is a focal length of the entire lens system, f1 is a focal length of the first lens, f2 is a focal length of the second lens, Da is a distance, on the optical axis, from the object side surface of the first lens to the image side surface of the second lens, TL is a distance, on the optical axis, from the object side surface of the first lens to an image plane, and DD is a distance, on the optical axis, between the first and second lenses.

$$0.50<f1/f\leq0.874 \quad (1\text{-}2)$$

$$0.6<Da/f<0.85 \quad (7)$$

$$1.06<TL/f<1.40 \quad (8)$$

$$0.05<DD/f<0.15 \quad (9\text{-}1)$$

$$0.01<f2/f<12.5 \quad (10\text{-}1)$$

An image pickup lens according to a fifth aspect of the present invention is an image pickup lens, including a first lens having a positive meniscus shape convex toward an object side, a second lens disposed on an image side of the first lens and has a meniscus shape convex toward the image side, and an aperture stop disposed on the object side of the image side surface of the first lens, wherein the image pickup lens is configured to satisfy conditional expressions give below in which f is a focal length of the entire lens system, R2 is a paraxial radius of curvature of the object side surface of the first lens, R3 is a paraxial radius of curvature of the image side surface of the first lens, and DD is a distance, on the optical axis, between the first and second lenses.

$$0.45<R2/R3<0.66 \quad (5\text{-}2)$$

$$0.05<DD/f\leq0.117 \quad (9\text{-}2)$$

Preferably, the image pickup lens according to the fifth aspect of the present invention further satisfies a conditional expression given below in which R5 is a paraxial radius of curvature of the object side surface of the second lens and R6 is a paraxial radius of curvature of the image side surface of the second lens.

$$0.45<R5/R6<1.55 \quad (11)$$

According to each aspect of the present invention, an image pickup lens is formed by a small number of two lenses in total and each lens is optimized such that the image pickup lens satisfies an appropriate conditional expression. Consequently, while reduced in total length, the image pickup lens may have advantages in ensuring wide angle of view, brightness, and back focus. Further, high image forming performance is likely to be realized easily. In addition, the performance may further be enhanced by employing and satisfying the following preferable configurations as appropriate.

Preferably, the mage pickup lenses according to first, second, and fifth aspects of the present invention satisfy at least one of the following conditional expressions.

$$0<f2/f<100 \quad (10\text{-}2)$$

$$0<(D5-D2)/f<0.23 \quad (12)$$

$$0.2<R3/f<0.52 \quad (13)$$

$$|Nd1-Nd2|\leq0.01 \quad (14)$$

$$|vd1-vd2|<0.1 \quad (15)$$

where,
f is a focal length of the entire lens system;
f2 is a focal length of the second lens;
D2 is a thickness of the first lens on the optical axis;
D5 is a thickness of the second lens on the optical axis;
R3 is a paraxial radius of curvature of the image side surface of the first lens;
Nd1 is a refractive index of the first lens with respect to d-line;
Nd2 is a refractive index of the second lens with respect to d-line;
vd1 is an Abbe number of the first lens with respect to d-line; and
vd2 is an Abbe number of the second lens with respect to d-line.

In the mage pickup lens according to each aspect of the present invention, it is preferable that the aperture stop is disposed between a surface apex position and an edge position of the object side surface of the first lens. Further, a field stop may be disposed between the first and second lenses.

An image pickup apparatus of the present invention is an apparatus having the image pickup lens of the present invention and an image sensor for outputting an imaging signal according to an optical image formed by the image pickup lens.

A portable terminal device of the present invention is a device having the image pickup device of the present invention and a display unit for displaying an image taken by the image pickup apparatus.

In the image pickup apparatus or portable terminal device of the present invention, a high resolution imaging signal may be obtained based on a high resolution optical image obtained by the image pickup lens of the present invention.

According to the present invention, an image pickup lens is formed by a small number of two lenses in total and each lens is optimized such that the image pickup lens satisfies a plurality of appropriate conditional expressions. Consequently, while reduced in total length, the image pickup lens may have advantages in ensuring wide angle of view, brightness, and back focus, as well as realizing high image forming performance.

According to the image pickup apparatus and portable terminal device of the present invention, an imaging signal is outputted according to an optical image formed by the image pickup lens of the present invention having high image forming performance, whereby a high resolution image may be obtained.

BRIEF DESCRIPTION OF THE DRAWINGS

FIG. 1 is a cross-sectional view of a first example configuration of an image pickup lens according to an embodiment of the present invention, which corresponds to Numerical Example 1.

FIG. 2 is a cross-sectional view of a second example configuration of an image pickup lens according to an embodiment of the present invention, which corresponds to Numerical Example 2.

FIG. 3 is a cross-sectional view of a third example configuration of an image pickup lens according to an embodiment of the present invention, which corresponds to Numerical Example 3.

FIG. 4 is a cross-sectional view of a fourth example configuration of an image pickup lens according to an embodiment of the present invention, which corresponds to Numerical Example 4.

FIG. 5 is a cross-sectional view of a fifth example configuration of an image pickup lens according to an embodiment of the present invention, which corresponds to Numerical Example 5.

FIG. 6 is a cross-sectional view of a sixth example configuration of an image pickup lens according to an embodiment of the present invention, which corresponds to Numerical Example 6.

FIG. 7 is a cross-sectional view of a seventh example configuration of an image pickup lens according to an embodiment of the present invention, which corresponds to Numerical Example 7.

FIG. 8 is a cross-sectional view of a eighth example configuration of an image pickup lens according to an embodiment of the present invention, which corresponds to Numerical Example 8.

FIG. 9 is a cross-sectional view of a ninth example configuration of an image pickup lens according to an embodiment of the present invention, which corresponds to Numerical Example 9.

FIG. 10 is a cross-sectional view of a tenth example configuration of an image pickup lens according to an embodiment of the present invention, which corresponds to Numerical Example 10.

FIG. 11 is a cross-sectional view of an eleventh example configuration of an image pickup lens according to an embodiment of the present invention, which corresponds to Numerical Example 11.

FIG. 12 illustrates various aberrations of Example 1, in which A illustrates spherical aberration, B illustrates astigmatism (field curvature), and C illustrates distortion.

FIG. 19 illustrates various aberrations of Example 8, in which A illustrates spherical aberration, B illustrates astigmatism (field curvature), and C illustrates distortion.

FIG. 20 illustrates various aberrations of Example 9, in which A illustrates spherical aberration, B illustrates astigmatism (field curvature), and C illustrates distortion.

DESCRIPTION OF THE PREFERRED EMBODIMENTS

[Lens Configuration]

Figures 13A, 13B, 13C:
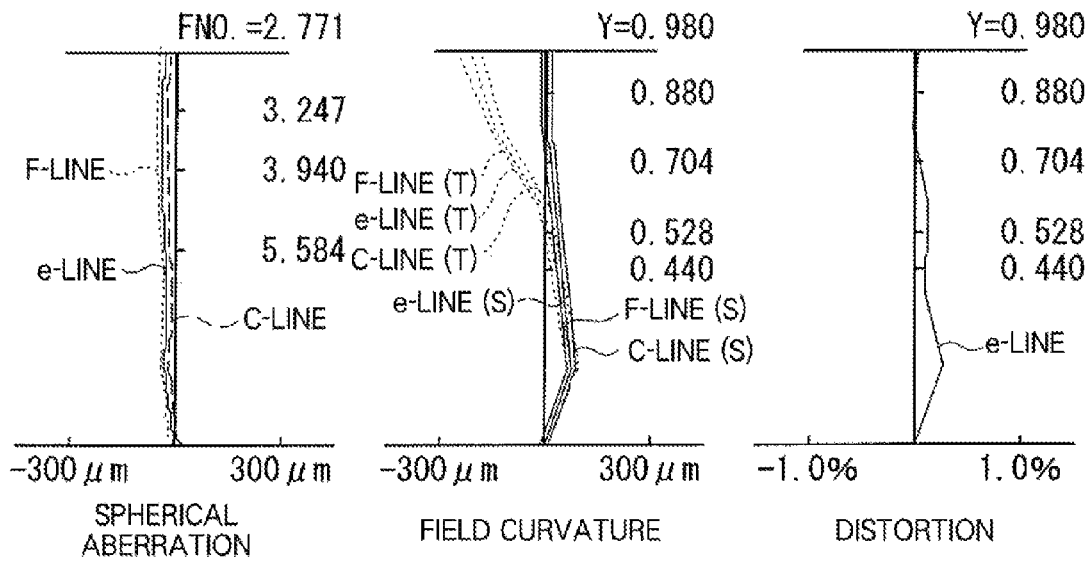
FIG. 13 illustrates various aberrations of Example 2, in which A illustrates spherical aberration, B illustrates astigmatism (field curvature), and C illustrates distortion.
Figures 14A, 14B, 14C:
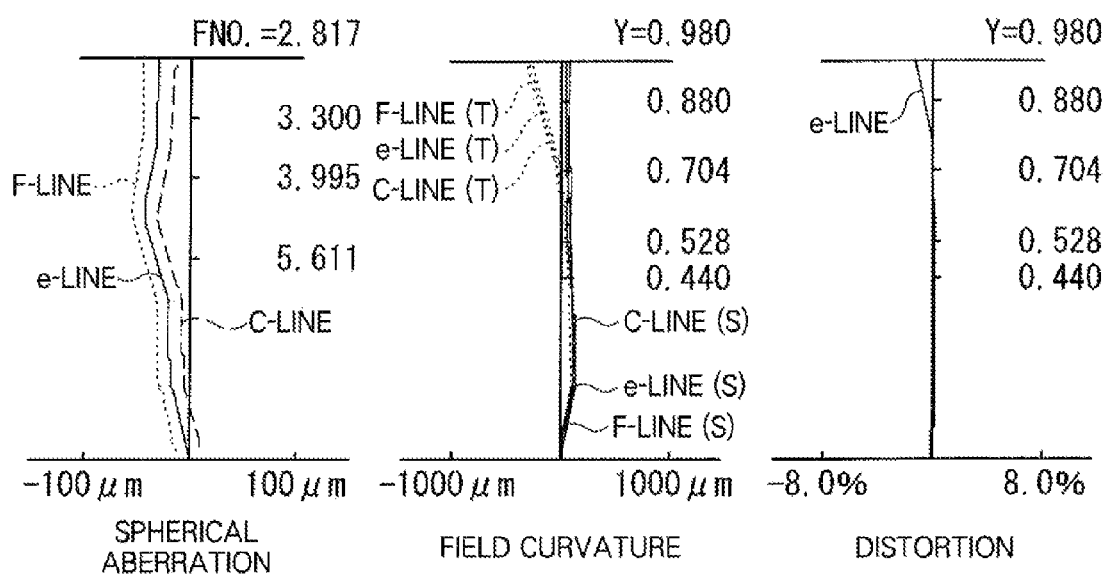
FIG. 14 illustrates various aberrations of Example 3, in which A illustrates spherical aberration, B illustrates astigmatism (field curvature), and C illustrates distortion.
Figures 15A, 15B, 15C:
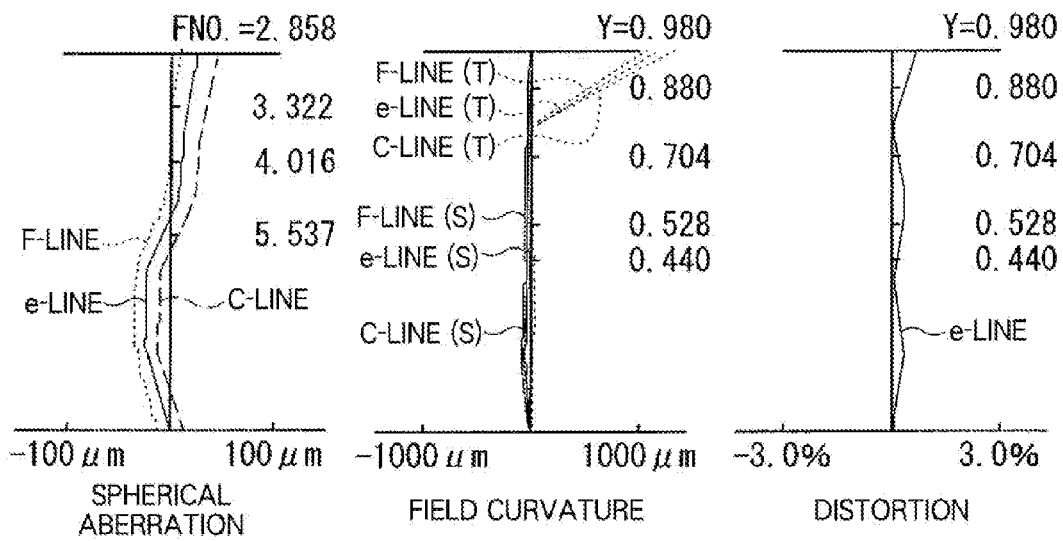
FIG. 15 illustrates various aberrations of Example 4, in which A illustrates spherical aberration, B illustrates astigmatism (field curvature), and C illustrates distortion.
Figures 16A, 16B, 16C:
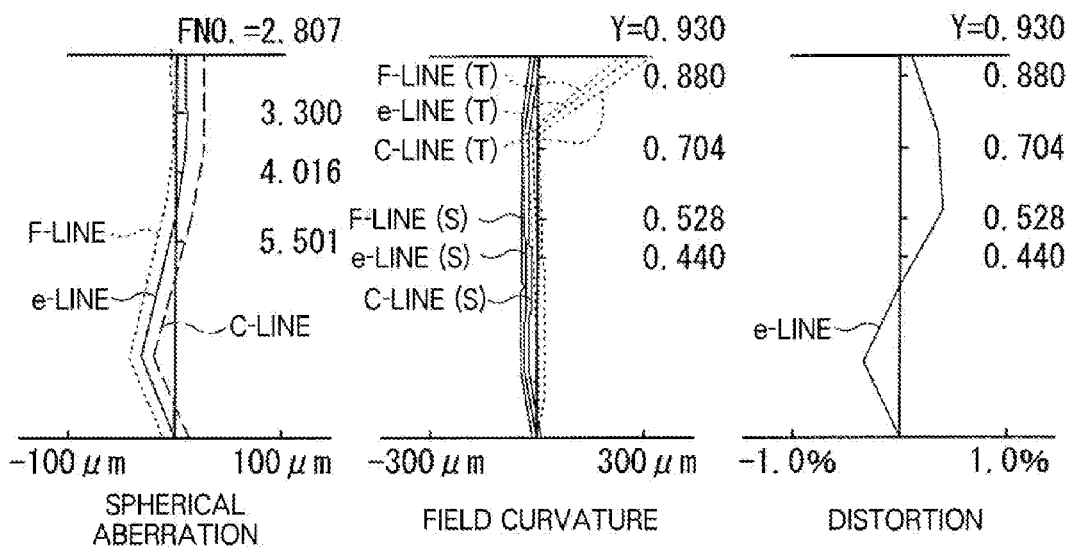
FIG. 16 illustrates various aberrations of Example 5, in which A illustrates spherical aberration, B illustrates astigmatism (field curvature), and C illustrates distortion.
Figures 17A, 17B, 17C:
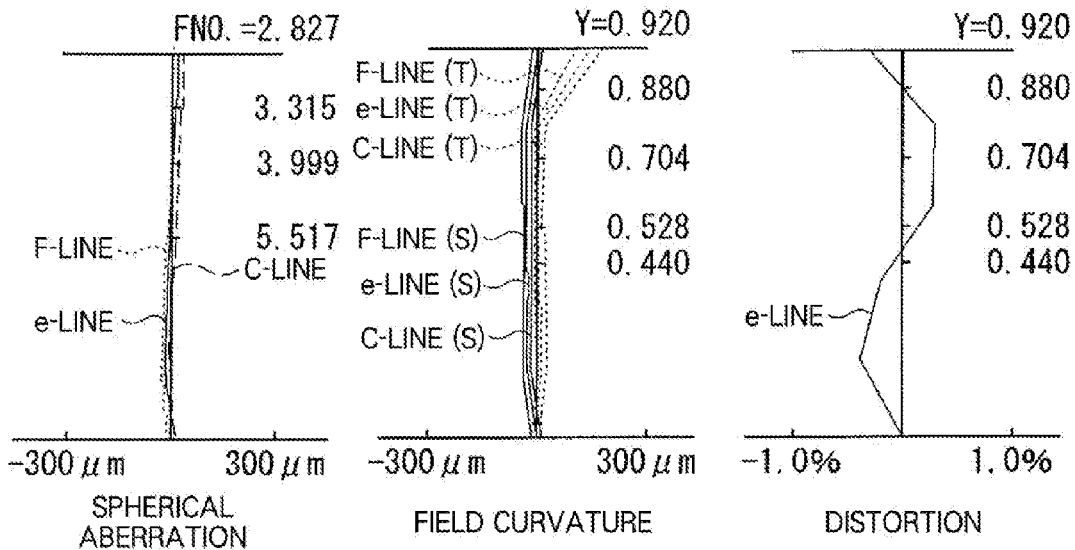
FIG. 17 illustrates various aberrations of Example 6, in which A illustrates spherical aberration, B illustrates astigmatism (field curvature), and C illustrates distortion.
Figures 18A, 18B, 18C:
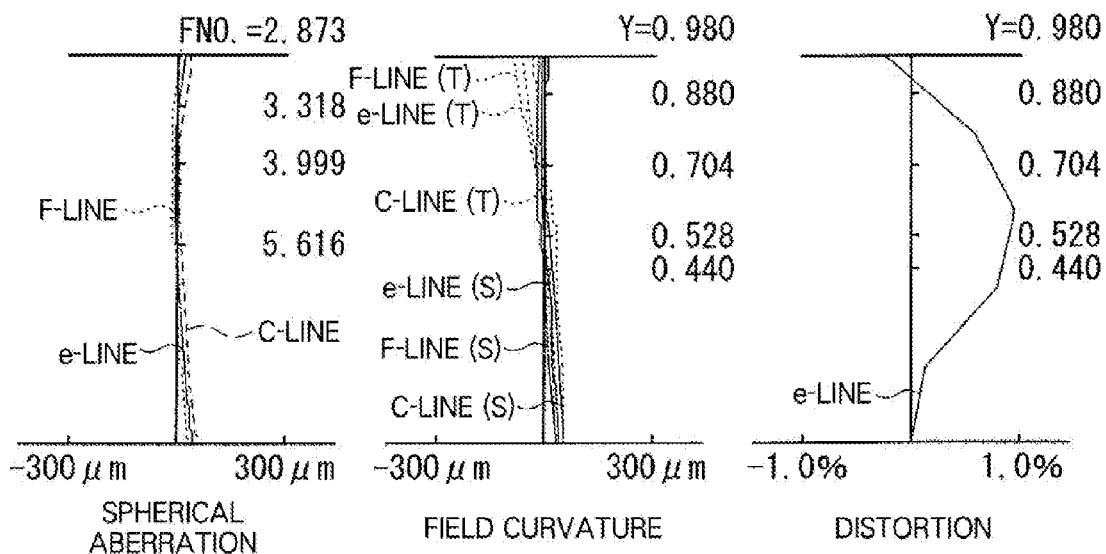
FIG. 18 illustrates various aberrations of Example 7, in which A illustrates spherical aberration, B illustrates astigmatism (field curvature), and C illustrates distortion.
Figures 21A, 21B, 21C:
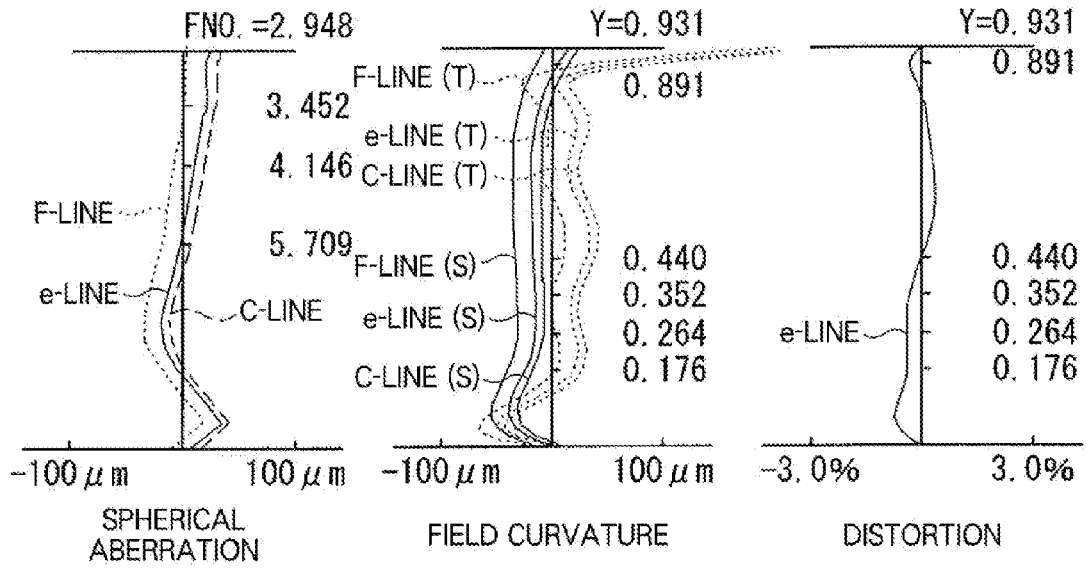
FIG. 21 illustrates various aberrations of Example 10, in which A illustrates spherical aberration, B illustrates astigmatism (field curvature), and C illustrates distortion.
Figures 22A, 22B, 22C:
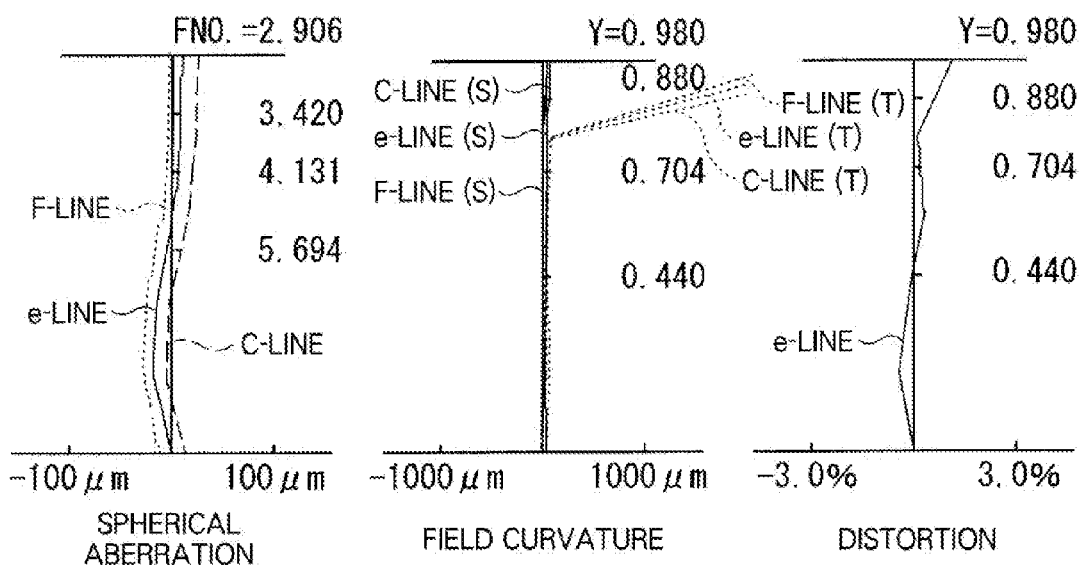
FIG. 22 illustrates various aberrations of Example 11, in which A illustrates spherical aberration, B illustrates astigmatism (field curvature), and C illustrates distortion.

Hereinafter, embodiments of the present invention will be described in detail with reference to the accompanying drawings. FIG. 1 is a first example configuration of an image pickup lens according to an embodiment of the present invention. This example configuration corresponds to a lens configuration of First Numerical Example, to be described later. Likewise, second to eleventh example configurations corresponding to Second Numerical Example to Eleventh Numerical Example respectively are shown in FIGS. 2 to 11. In FIGS. 1 to 11, the reference symbol Ri represents a radius of curvature of an $i^{th}$ surface, the surface number being gradually incremented toward image side (image plane side) with the surface of the lens element disposed on the most object side being taken as the first surface. Reference symbol Di represents a surface distance between $i^{th}$ surface and $i^{th}+1$ surface on optical axis Z1.

The image pickup lens according to the present embodiment includes from the object side in the order of first lens G1 and second lens G2 along optical axis Z1.

Preferably, aperture stop St is disposed on the object side of the surface apex of the image side surface of lens G1 on optical axis Z1, thereby being disposed on the most object side of the lens system. Preferably, aperture stop St is disposed between the surface apex position of the object side surface of first lens G1 and edge position of the object side surface of first lens G1 on optical axis Z1.

In the image pickup lens described above, field stop St2 may be disposed between first lens G1 and second lens G2. Here, aperture stop St1 is a stop for limiting image brightness and field stop St2 is a stop for limiting image size. Field stop St2 is effective as countermeasures against flare and ghost.

Image plane Simg of the image pickup lens includes an image sensor, such as a CCD or the like. Various types of optical members CG may be disposed between second lens G2 and the image sensor according to the camera side structure on which the lens is mounted. For example, flat plate optical members, such as a cover glass for protecting the image plane and an infrared cut filter, may be disposed. In this case, for example, a flat plate cover glass with a coating having a filter effect, such as infrared cut filter, ND filter, or the like, applied thereon may be used as optical member CG. In the image pickup lens, all of lenses G1 and G2 or at least one lens surface may have a coating having a filter effect, such as infrared cut filter, ND filter, or the like, or an anti-reflection coating.

Preferably, first lens G1 has a positive refractive power in a paraxial region. Preferably, first lens G1 is a bi-aspherical lens and, as a total shape, the concave and convex shapes are orientated in the same direction from a paraxial region to a peripheral region within an effective diameter. More specifically, it is preferable that first lens G1 has a meniscus shape convex toward the object side from a paraxial region to a peripheral region within an effective diameter.

Preferably, second lens G2 has a positive refractive power in a paraxial region. Preferably, second lens G2 is a bi-aspherical lens and, as an overall shape, the concave and convex shapes are orientated in the same direction from a paraxial region to a peripheral region within an effective diameter. More specifically, it is preferable that second lens G2 has a meniscus shape convex toward the image side from a paraxial region to a peripheral region within an effective diameter.

Preferably, the image pickup lens described above selectively satisfies the following plurality of conditions as appropriate. In the following conditional expressions, the following reference symbols represent the following: f represents a focal length of the entire lens system; f1 represents a focal length of first lens G1; f2 represents a focal length of second lens G2; R2 represents a paraxial radius of curvature of an object side surface of first lens G1; R3 represents a paraxial radius of curvature of an image side surface of first lens G1; R5 represents a paraxial radius of curvature of an object side surface of second lens G2; R6 represents a paraxial radius of curvature of an image side surface of second lens G2; Da represents a distance, on the optical axis, from the object side surface of first lens G1 to the image side surface of second lens G2; TL represents a distance, on the optical axis, from the object side surface of first lens G1 to the image plane (FIG. 1); DD represents a distance, on the optical axis, between first lens G1 and second lens G2; D2 represents a thickness of first lens G1 on the optical axis; D5 represents a thickness of second lens G2 on the optical axis; vd1 represents an Abbe number of first lens G1 with respect to d-line; vd2 represents an Abbe number of second lens G2 with respect to d-line; Nd1 represents a refractive index of first lens G1 with respect to d-line; and Nd2 represents a refractive index of second lens G2 with respect to d-line. In FIG. 1, the value of D2+D3+D4+D5 corresponds to Da, and the value of D3+D4 corresponds to DD. For a back focus portion of TL (distance, on the optical axis, from the image side surface of second lens G2 to the image plane), an air converted distance is used.

| | |
|---|---|
| $1.149 \leq f1/f < 1.50$ | (1-1) or |
| $0.50 < f1/f \leq 0.874$ | (1-2) |
| $1.1 < f2/f1 < 3.9$ | (2-1) or |
| $1.1 < f2/f1 < 45.0$ | (2-2) |
| $2.0 < (R5+R6)/(R5-R6) < 5.4$ | (3-1) or |
| $-40.0 < (R5+R6)/(R5-R6) < -5.8$ | (3-2) |
| $-30 < (R2+R3)/(R2-R3) - 5.991$ | (4-1) or |
| $-5.00 < (R2+R3)/(R2-R3) < -0.05$ | (4-2) |
| $0.7 < R2/R3 < 1.2$ | (5-1) or |
| $0.45 < R2/R3 < 0.66$ | (5-2) |
| $Nd1 < 1.6$ | (6) |
| $0.6 < Da/f < 0.85$ | (7) |
| $1.06 < TL/f < 1.40$ | (8) |
| $0.05 < DD/f < 0.15$ | (9-1), preferably |
| $0.05 < DD/f \leq 0.117$ | (9-2) |
| $0.01 < f2/f < 12.5$ | (10-1) or |
| $0 < f2/f < 100$ | (10-2), preferably |
| $0 < f2/f < 20$ | (10-3) |
| $0.45 < R5/R6 < 1.55$ | (11) |
| $0 < (D5-D2)/f < 0.23$ | (12), preferably |
| $0 < (D5-D2)/f < 0.2$ | (12'), more preferably |
| $0 < (D5-D2)/f < 0.15$ | (12'') |
| $0.2 < R3/f < 0.52$ | (13), preferably |
| $0.28 < R3/f < 0.47$ | (13') |
| $|Nd1-Nd2| \leq 0.01$ | (14) |
| $|vd1-vd2| < 0.1$ | (15) |
| $Nd2 < 1.6$ | (16) |
| $0.08 < Da/DD < 0.2$ | (17), preferably |
| $0.1 < Da/DD < 0.176$ | (17') |

[Operations/Advantageous Effects]

Operations and advantageous effects of the image pickup lens configured in the manner as described above will now be described. The image pickup lens of the present embodiment is configured by a small number of two lenses and has advantages for ensuring wide angle of view, brightness, and back focus with a reduced total lens length by optimizing each lens to satisfy an appropriate conditional expression. For example, a wide horizontal angle of view of not less than 50 degrees is likely to be achieved with a bright F-number of about 2.8. In addition, high image forming performance is likely to be achieved by sufficiently correcting aberrations, including spherical aberration, distortion, chromatic aberration, and the like.

The image pickup lens has an advantage in that it uses aspherical surfaces for first lens G1 and second lens G2 to maintain aberration performance. Generally, it is preferable that image pickup lens systems have telectricity, that is, the incident angle of the chief ray becomes substantially parallel to the optical axis (incident angle on the image plane becomes close to zero with respect to normal line). In order to ensure the telecentricity, it is preferable that aperture stop St1 is disposed at a position as close to the object side as possible. On the other hand, if aperture stop St1 is disposed at a position further away from the object side surface of first lens G1 in the object side direction, the distance between aperture stop St1 and the object side surface of first lens G1 is added to the optical path, which is disadvantageous for downsizing the overall configuration. Consequently, telecentricity may be ensured while reducing the total length by disposing aperture stop St1 at a position on optical axis Z1 corresponding to the surface apex position of the object side surface of first lens G1 or a position on optical axis Z1 between the surface apex position of the object side surface of first lens G1 and the surface apex position of the image side surface of first lens G1. Where the telecentricity is more important, aperture stop St1 may be disposed at a position on optical axis Z1 between the surface apex position of the object side surface of first lens G1 and edge position of the object side surface of first lens G1.

Conditional Expressions (1-1) and (1-2) relate to a refractive power of first lens G1. When f1/f exceeds the upper limit of Conditional Expression (1-1) or (1-2), the total length becomes too long with a wide angle of view being maintained. When f1/f is below the lower limit of Conditional Expression (1-1) or (1-2), spherical aberration becomes large.

Conditional Expressions (2-1) and (2-2) relate to an appropriate balance between focal length f1 of first lens G1 and focal length f2 of second lens G2, and are provided for balancing between paraxial aberrations and image plane characteristics. When f2/f1 is below the lower limit of Conditional Expression (2-1) or (2-2), a back focus becomes short among other things. When f2/f1 exceeds the upper limit of Conditional Expression (2-1) or (2-2), the total length becomes long among other things.

Conditional Expressions (3-1) and (3-2) relate to an appropriate shape of second lens G2 and are provided for balancing between an exit pupil position and distortion with a wide field angle being maintained. When $(R5+R6)/(R5-R6)$ is below the lower limit of Conditional Expressions (3-1) or (3-2), the exit pupil position becomes too close among other things and telecentricity adjacent to the image plane becomes difficult to secure. When $(R5+R6)/(R5-R6)$ exceeds the upper limit of Conditional Expression (3-1) or (3-2), degradation in distortion becomes large among other things.

Conditional Expressions (4-1) and (4-2) relate to an appropriate shape of first lens G1 and are provided for balancing between spherical aberration and field curvature with a wide field angle being maintained. When $(R2+R3)/(R2-R3)$ is below the lower limit of Conditional Expression (4-1) or (4-2), spherical aberration is likely to be over corrected in a peripheral region in comparison with an intermediate region among other things. When $(R2+R3)/(R2-R3)$ exceeds the upper limit of Conditional Expression (4-1) or (4-2), spherical aberration is likely to be under corrected in a peripheral region in comparison with an intermediate region among other things.

Conditional Expressions (5-1) and (5-2) relate to an appropriate shape of first lens G1. When R2/R3 is below the lower limit of Conditional Expression (5-1) or (5-2), spherical aberration is likely to be under corrected among other things. When R2/R3 exceeds the upper limit of Conditional Expression (5-1) or (5-2), the total lens length is likely to become long.

Conditional Expressions (6), (14), (15), and (16) relate to a glass material of first lens G1 and second lens G2. A lens system having a relatively small number of two lenses has a wide usage environment and, therefore, the requirement against performance degradation due to environmental change, in particular, temperature change is strict. Second lens G2 is effective to a certain extent for aberration correction and total length reduction and has a freedom in selectable range with respect to chromatic aberration. But, in order not to be influenced by unstable factors, such as the changes in material quality, cost, and the like by the material supplier, it is preferable that first lens G1 and second lens G2 are made of materials having substantially identical qualities. For this reason, it is preferable that the image pickup lens satisfies Conditional Expressions (14) and (15). Further, first lens G1 and second lens G2 are likely to have a special shape having a large tangent angle, but they can be well manufactured using a synthetic resin satisfying Conditional Expressions (6) and (16), i.e., having a refractive index smaller than 1.6.

Conditional Expression (7) relates to appropriate thicknesses of first lens G1 and second lens G2 and an appropriate lens distance between them. When Da/f is below the lower limit of Conditional Expression (7), it is difficult for first lens G1 and second lens G2 to have appropriate thicknesses and to secure an appropriate distance between the lenses with a wide angle of view being maintained. When Da/f exceeds the upper limit of Conditional Expression (7), it is difficult to reduce the total lens length while securing a required back focus.

Conditional Expression (8) relates to an appropriate total lens length. When TL/f is below the lower limit of Conditional Expression (8), the restriction on the total lens length influences aberrations as a whole with a wide angle of view being maintained. Further, it becomes difficult to set the exit pupil position at a distance while increasing peripheral light intensity. When TL/f exceeds the upper limit of Conditional Expression (8), it is difficult to reduce the total length with a wide angle of view being maintained.

Conditional Expressions (9-1) and (9-2) relate to an appropriate lens distance between first lens G1 and second lens G2. When DD/f is below the lower limit of Conditional Expression (9-1) or (9-2), an appropriate depth can not be ensured at each of the image side surface of first lens G1 and the object side surface of second lens G2, causing a large geometric constraint. As a result, aberration correction can not be performed sufficiently. Otherwise, a thickness for providing field stop St2 can not be secured between first lens G1 and second lens G2, whereby anti-flaring or anti-ghosting can not be performed by field stop St2. When DD/f exceeds the upper limit of Conditional Expression (9-1) or (9-2), the total lens length, back focus, and lens center thickness are affected and paraxial aberrations and low-order aberrations, in particular, become insufficient.

Conditional Expressions (10-1), (10-2), and (10-3) relate to a refractive power of second lens G2 and are provided for balancing between paraxial aberrations and image plane characteristics. When f2/f is below the lower limit of Conditional Expression (10-1), (10-2), or (10-3), the back focus is reduced among other things. Further, spherical aberration, in particular, is likely to be over corrected in a peripheral region in comparison with an intermediate region. When f2/f exceeds the upper limit of Conditional Expression (10-1), (10-2), or (10-3), the total length becomes long among other things. In addition, spherical aberration, in particular, is likely to be under corrected in a peripheral region in comparison with an intermediate region.

Conditional Expression (11) relates to an appropriate shape of second lens G2. When R5/R6 is below the lower limit of Conditional Expression (11), exit pupil is too close to secure telecentricity adjacent to the image plane, in particular, at an intermediate angle of view. When R5/R6 exceeds the upper limit of Conditional Expression (11), the back focus becomes short among other things.

Conditional Expressions (12), (12'), and (12") relate to lens thicknesses of first lens G1 and second lens G2. When (D5−D2)/f is below the lower limit of Conditional Expression (12), (12'), or (12"), if a thickness of each of first lens G1 and second lens G2 is tried to be secured at a peripheral portion, while maintaining a wide angle of view, it is necessary to increase the size of second lens G2 as the effective diameter of second lens G2 is larger than that of first lens G1, so that second lens G2 becomes large. When (D5−D2)/f exceeds the upper limit of Conditional Expression (12), (12'), or (12"), the back focus becomes short or field curvature and distortion become large in the negative side.

Conditional Expressions (13) and (13') relate to an image side surface shape of first lens G1. When R3/f is below the lower limit of Conditional Expression (13) or (13'), spherical aberration is likely to be over corrected in a peripheral region in comparison with an intermediate region among other things. When R3/f exceeds the upper limit of Conditional Expression (13) or (13'), spherical aberration is likely to be under corrected in a peripheral region in comparison with an intermediate region among other things.

Conditional Expressions (17) and (17') relate to an appropriate lens distance between first lens G1 and second lens G2. When Da/DD is below the lower limit of Conditional Expression (17) or (17'), an appropriate depth can not be ensured at each of the image side surface of first lens G1 and the object side surface of second lens G2, causing a large geometric constraint. As a result, aberration correction can not be performed sufficiently. Otherwise, a thickness for providing field stop St2 can not be secured between first lens G1 and second lens G2, whereby anti-flaring or anti-ghosting can not be performed by field stop St2. When DD/f exceeds the upper limit of Conditional Expression (17) or (17'), the total lens length, back focus, and lens center thickness are affected and paraxial aberrations and low-order aberrations, in particular, become insufficient.

[Example Combinations of Conditional Expressions and Operations/Advantageous Effects]

Examples of preferable configurations which take into account each of the conditional expressions described above and operations/advantageous effects thereof will now be described. A plurality of combination examples (configuration groups) to be described herein below is possible. The relationships between these configuration groups and conditional expressions and correspondence relationships between these configuration groups and Examples, to be described later, are shown in [Table 23], [Table 24], and [Table 25], to be described later.

First Combination Example

Configuration Group (A-1)

$$1.149 \leq f1/f < 1.50 \quad (1\text{-}1)$$

$$1.1 < f2/f1 < 3.9 \quad (2\text{-}1)$$

$$2.0 < (R5+R6)/(R5-R6) < 5.4 \quad (3\text{-}1)$$

Although formed of a small number of two lenses as a whole, the configuration group (A-1) above may reduce total lens length TL with a relatively wide horizontal angle of view of not less than 50 degrees. In addition, it is excellent in distortion performance, peripheral light intensity, and the like, thereby providing high resolution from the center to periphery.

Second Combination Example

Configuration Group (A-2)

$$2.0 < (R5+R6)/(R5-R6) < 5.4 \quad (3\text{-}1)$$

$$-30 < (R2+R3)/(R2-R3) - 5.991 \quad (4\text{-}1)$$

$$0.7 < R2/R3 < 1.2 \quad (5\text{-}1)$$

$$Nd1 < 1.6 \quad (6)$$

The configuration group (A-2) above may keep field curvature negative in the range from the optical axis to an intermediate angle of field while maintaining spherical aberration under correction in the center and intermediate region of the pupil by appropriately defining paraxial surface shapes of both second lens G2 and first lens G1 by Conditional Expressions (3-1) and (4-1). This allows resolving power to be made uniform in the range from intermediate to peripheral image heights.

Third Combination Example

Configuration Group (B)

$$-40.0 < (R5+R6)/(R5-R6) < -5.8 \quad (3\text{-}2)$$

$$-5.00 < (R2+R3)/(R2-R3) < -0.05 \quad (4\text{-}2)$$

The configuration group (B) above may keep field curvature negative in the range from the optical axis to an intermediate angle of field while maintaining spherical aberration under correction in the center and intermediate region of the pupil by appropriately defining paraxial surface shapes of both second lens G2 and first lens G1 by Conditional Expressions (3-2) and (4-2). This allows resolving power to be made uniform in the range from intermediate to peripheral image heights.

Fourth Combination Example

Configuration Group (C-1)

$$0.6 < Da/f < 0.85 \quad (7)$$

$$1.06 < TL/f < 1.40 \quad (8)$$

$$0.05 < DD/f \leq 0.117 \quad (9\text{-}2)$$

In the case of Configuration Group (C-1), it is preferable that at least one of the following conditional expressions is further satisfied.

$$1.1 < f2/f1 < 45.0 \qquad (2\text{-}2)$$

$$0.50 < f1/f \leq 0.874 \qquad (1\text{-}2)$$

$$0.01 < f2/f < 12.5 \qquad (10\text{-}1)$$

Configuration Group (C-1) may reduce total lens length TL, ensure a required back focus, and maintain appropriate resolving power while securing an appropriate central lens thickness by Conditional Expression (9-2). More specifically, Configuration Group (C-1) may keep field curvature negative in the range from the optical axis to an intermediate angle of field while maintaining spherical aberration under correction in the center and intermediate region of the pupil. This allows resolving power to be made uniform in the range from intermediate to peripheral image heights.

Fifth Combination Example

Configuration Group (C-2)

$$1.1 < f2/f1 < 45.0 \qquad (2\text{-}2)$$

$$0.6 < Da/f < 0.85 \qquad (7)$$

$$0.05 < DD/f \leq 0.117 \qquad (9\text{-}2)$$

Configuration Group (C-2) may reduce total lens length TL and ensure a required back focus, as well as maintaining appropriate resolving power by Conditional Expressions (2-2) and (7), while securing an appropriate central lens thickness by Conditional Expression (9-2). More specifically, Configuration Group (C-2) may keep field curvature negative in the range from the optical axis to an intermediate angle of field while maintaining spherical aberration under correction in the center and intermediate region of the pupil. This allows resolving power to be made uniform in the range from intermediate to peripheral image heights.

Sixth Combination Example

Configuration Group (C-3)

$$0.50 < f1/f \leq 0.874 \qquad (1\text{-}2)$$

$$0.05 < DD/f < 0.15 \qquad (9\text{-}1)$$

$$0.01 < f2/f < 12.5 \qquad (10\text{-}1)$$

Configuration Group (C-3) may reduce total lens length TL and ensure a required back focus, as well as maintaining appropriate resolving power by Conditional Expressions (1-2) and (10-1), while securing an appropriate central lens thickness by Conditional Expression (9-1). More specifically, Configuration Group (C-3) may keep field curvature negative in the range from the optical axis to an intermediate angle of field while maintaining spherical aberration under correction in the center and intermediate region of the pupil. This allows resolving power to be made uniform in the range from intermediate to peripheral image heights.

Seventh Combination Example

Configuration Group (D-1)

$$0.05 < DD/f \leq 0.117 \qquad (9\text{-}2)$$

$$0.45 < R5/R6 < 1.55 \qquad (11)$$

Configuration Group (D-1) may reduce total lens length TL and ensure a required back focus, as well as maintaining appropriate resolving power by Conditional Expression (11), while securing an appropriate central lens thickness by Conditional Expression (9-2). More specifically, Configuration Group (D-1) may keep field curvature negative in the range from the optical axis to an intermediate angle of field while maintaining spherical aberration under correction in the center and intermediate region of the pupil. This allows resolving power to be made uniform in the range from intermediate to peripheral image heights.

Eighth Combination Example

Configuration Group (D-2)

$$0.45 < R2/R3 < 0.66 \qquad (5\text{-}2)$$

$$0.05 < DD/f \leq 0.117 \qquad (9\text{-}2)$$

In the case of Configuration Group (D-2), it is preferable that the following conditional expression is further satisfied.

$$0.45 < R5/R6 < 1.55 \qquad (11)$$

Configuration Group (D-2) may reduce total lens length TL and ensure a required back focus, as well as maintaining appropriate resolving power by Conditional Expression (5-2), while securing an appropriate central lens thickness by Conditional Expression (9-2). More specifically, Configuration Group (D-2) may keep field curvature negative in the range from the optical axis to an intermediate angle of field while maintaining spherical aberration under correction in the center and intermediate region of the pupil. This allows resolving power to be made uniform in the range from intermediate to peripheral image heights.

<More Preferable Combinations>

In the first to Third Combination Examples or in Fifth to Eighth Combination Examples, it is preferable that the following conditional expression is satisfied.

$$0 < f2/f < 100 \qquad (10\text{-}2)$$

More preferably, $$0 < f2/f < 20 \qquad (10\text{-}3)$$

Further, in the first to Eighth Combination Examples, it is preferable that at least one of the following conditional expressions is satisfied.

$$0 < (D5-D2)/f < 0.23 \qquad (12)$$

$$0.2 < R3/f < 0.52 \qquad (13)$$

$$|Nd1-Nd2| \leq 0.01 \qquad (14)$$

$$Nd1 < 1.6 \qquad (6)$$

$$Nd2 < 1.6 \qquad (16)$$

$$0.08 < Da/DD < 0.2 \qquad (17)$$

As described above, according to the present embodiment, an image pickup lens is formed by a small number of two lenses in total and each lens is optimized so that the image pickup lens satisfies a plurality of appropriate conditional expressions. Consequently, while reduced in total length, the image pickup lens of the present embodiment may have advantages in ensuring wide angle of view, brightness, and back focus, as well as realizing high image forming performance. Further, according to the image pickup apparatus or portable terminal device of the present embodiment, an imaging signal is outputted according to an optical image formed by the image pickup lens reduced in total length and enhanced in image forming performance, so that downsizing of the apparatus or device as a whole may be realized. Further, a high resolution imaging signal may be obtained and a high resolution image may be obtained based on the imaging signal.

[Example Application to Image Pickup Apparatus]

Figure 23:
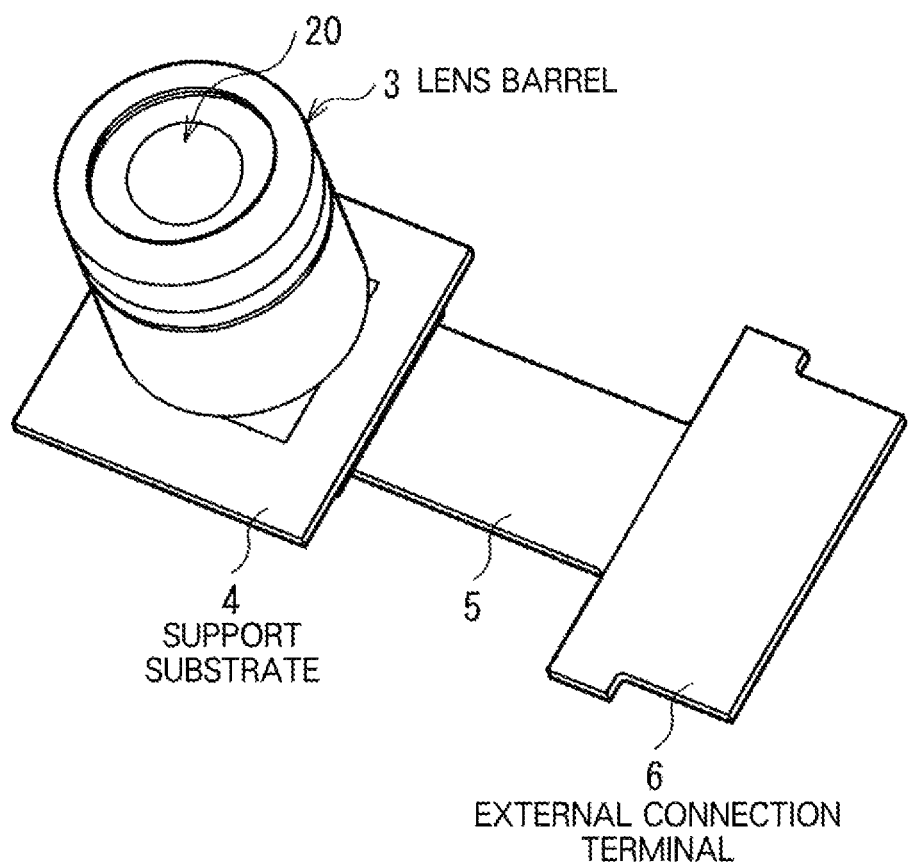
FIG. 23 is a perspective view of a camera module, as an image pickup apparatus according to an embodiment of the present invention, illustrating an example structure thereof.
Figure 24A:
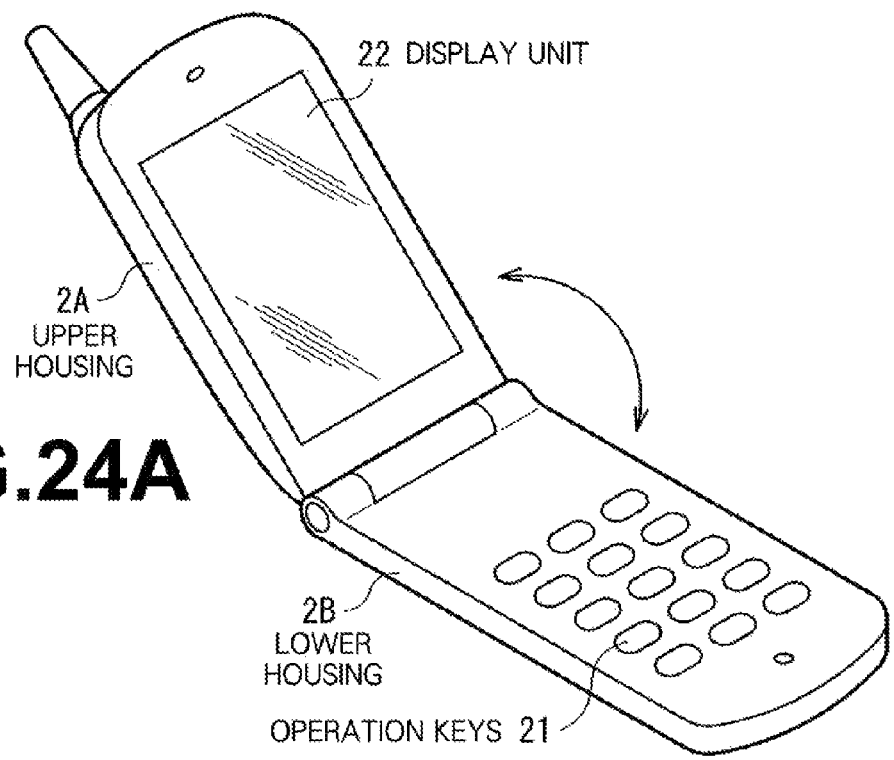
FIG. 24A is an external view of a camera-equipped cell phone, as a portable terminal device according to an embodiment of the present invention, illustrating an example structure thereof.
Figure 24B:
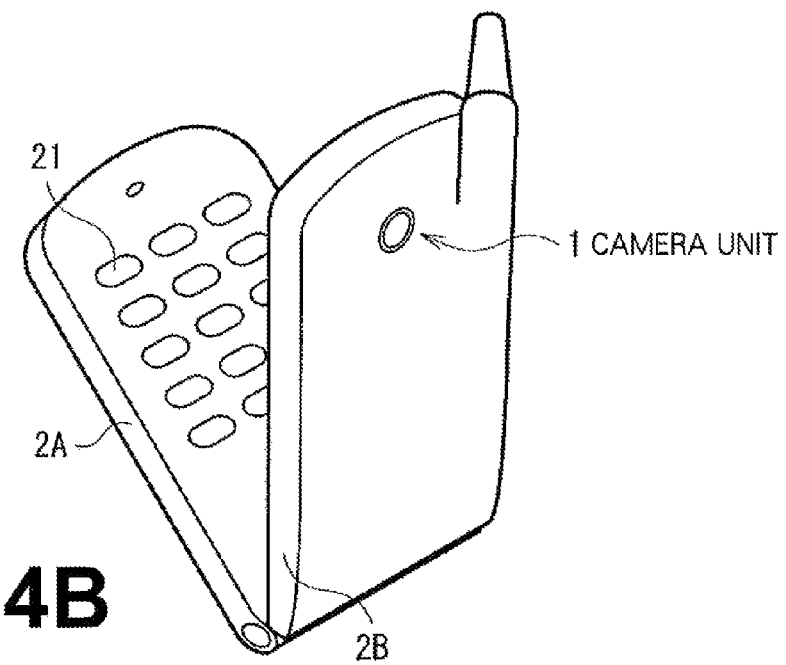
FIG. 24B is an external view of a camera-equipped cell phone, as a portable terminal device according to an embodiment of the present invention, illustrating an example structure thereof.

FIGS. 24A and 24B illustrate a camera-equipped cell phone, as an example of portable terminal device according to an embodiment. FIG. 23 illustrates an example structure of an image pickup apparatus according to an embodiment. The camera-equipped cell phone illustrated in FIGS. 24A and 24B includes upper housing 2A and lower housing 2B which are pivotable in the allow directions in FIG. 24A. Lower housing 2B includes operation keys 21 and the like. Upper housing 2A includes camera unit 1 (FIG. 24B), display unit (display means) 22 (FIG. 24A), and the like. Display unit 22 includes a display panel such as LCD (liquid crystal display), EL (electroluminescence) panel, or the like. Display unit 22 is disposed on a surface which becomes an inner side when the housings are folded together. Display unit 22 is capable of displaying an image obtained by camera unit 1 and the like, in addition to various menu items related to telephone function. Camera unit 1 is disposed, for example, on the rear side of upper housing 2A, but the place where camera unit 1 is provided is not limited to this.

Camera unit 1 includes, for example, a camera module shown in FIG. 23. The camera module includes a lens barrel 3 in which image pickup lens 20 is accommodated, support substrate 4 for supporting lens barrel 3, and an image sensor (not shown) provided at a position on support substrate 4 corresponding to the image plane of image pickup lens 20, as shown in FIG. 23. Camera unit 1 further includes flexible substrate 5 electrically connected to the image sensor provided on support substrate 4 and external connection terminal 6 electrically connected to flexible substrate 5 and structured to be connectable to a signal processing circuit provided on the cell phone body. These components are integrally constructed.

In camera unit 1, an optical image formed by image pickup lens 20 is converted to an electrical imaging signal by the image sensor and the imaging signal is outputted to the signal processing circuit provided on the apparatus body. The use of the image pickup lens of the present embodiment as image pickup lens 20 of such camera-equipped cell phone allows a sufficiently aberration corrected high resolution imaging signal to be obtained. Cell phone body may generate a high resolution image based on the imaging signal.

The image pickup lens of the present embodiment may be applied to various types of image pickup apparatuses and portable terminal devices that employ image sensors, such as CCD, CMOS, and the like. The image pickup apparatus or portable terminal device of the present embodiment is not limited to a camera-equipped cell phone and it may be, for example, a digital still camera, a PDA, or the like.

EXAMPLES

Specific Numerical Examples of the image pickup lens of the present invention will now be described. Hereinafter, a plurality of Numerical Examples is collectively described part by part.

Numerical Example 1

[Table 1] and [Table 2] show specific lens data corresponding to the configuration of image pickup lens in FIG. 1. More specifically, [Table 1] shows basic lens data of the image pickup lens and [Table 2] shows aspherical surface data. In the lens data shown in [Table 1], surface number column Si represents $i^{th}$ surface number (i=1 to 9) of the image pickup lens according to Example 1, which is gradually incremented toward image side with the surface of the component disposed on the most object side being taken as the first surface. The radius of curvature column Ri represents a radius of curvature (mm) of $i^{th}$ surface from the object side corresponding to symbol Ri in FIG. 1. Likewise, surface distance column Di represents a surface distance (mm) on the optical axis between $i^{th}$ surface Si and $i^{th}$+1 surface Si+1 from the object side. Ndj and vdj columns represent a refractive index and an Abbe number of $j^{th}$ optical element from the object side with respect to d-line (wavelength of 587.6 nm) respectively.

[Table 1] further includes an effective radius or aperture radius Yi (mm) of each surface. The effective radii and aperture radii in the lens data are design values. Although the value of effective radius (image height) at the image plane is 0.98 (mm) in the lens data, it is preferable that the image height is 0.88 (mm) in manufacturing from the viewpoint of image resolution.

In the image pickup lens according to Example 1, each of first lens G1 and second lens G2 has an aspherical shape on each side. In the basic data of [Table 1], values of radii of curvature adjacent to the optical axis (paraxial radii of curvature) are shown as the radii of curvature of the aspherical surfaces.

[Table 2] shows aspherical surface data of the image pickup lens according to Example 1. In the values shown as aspherical surface data, the symbol "E" indicates that the numerical value that follows is power to base 10, and the value preceding the symbol is multiplied by the value represented by the exponential function to base 10. For example, 1.0E−02 refers to $1.0 \times 10^{-2}$.

As for the aspherical surface data, values of each of coefficients Ai and K in Formula (A) given below which represents an aspherical surface shape are shown. More specifically, Z represents a length of a perpendicular line (mm) drawn from a point on an aspherical surface at a height of h from the optical axis to the tangent plane (a plane perpendicular to the optical axis) to the apex of the aspherical surface.

$$Z = C \cdot h^2 / \{1 + (1 - K \cdot C^2 \cdot h^2)^{1/2}\} + \Sigma A_i \cdot h^i \quad (A)$$

where:

Z: depth of aspherical surface (mm)

H: distance (height) from optical axis to lens surface (mm)

K: eccentricity

C: paraxial curvature=1/R (R: paraxial radius of curvature)

$\Sigma A_i \cdot h^i$: sum of $A_i \cdot h^i$ when i=3 to n (n: integer not less than 3)

$A_i$: $i^{th}$ order aspherical surface coefficient In the aspherical surfaces of the image pickup lens according to Example 1, aspherical surface coefficients $A_n$ are indicated using $A_3$ to $A_{17}$ orders as effective based on Aspherical Surface Formula (A) given above.

TABLE 1

EXAMPLE 1 • BASIC LENS DATA

| S i (SURFACE NUMBER) | R i (RADIUS OF CURVATURE) | Di (SURFACE DISTANCE) | Nd j (REFRACTIVE INDEX) | ν d j (ABBE NUMBER) | Yi (EFFECTIVE RADIUS, APERTURE RADIUS) |
|---|---|---|---|---|---|
| 1 (APERTURE STOP) | — | −0.08 | | | 0.244 |
| 2 | 0.381 | 0.29 | 1.5438 | 55.7 | 0.245 |
| 3 | 0.500 | 0.08 | | | 0.223 |
| 4 (FIELD STOP) | — | 0.08 | | | 0.235 |
| 5 | −3.733 | 0.48 | 1.5438 | 55.7 | 0.266 |
| 6 | −1.549 | 0.23 | | | 0.549 |
| 7 | ∞ | 0.15 | 1.5168 | 64.2 | |
| 8 | ∞ | 0.33 | | | |
| 9 (IMAGE PLANE) | ∞ | | | | 0.980 |

TABLE 2

EXAMPLE 1 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 1.25760E+00 | 1.63520E+00 | 2.00000E+00 | 1.88296E+00 |
| A3 | −7.73292E+00 | −8.82943E+00 | −5.82246E+00 | −3.54895E+00 |
| A4 | 2.26488E+02 | 9.22114E+01 | 6.45915E+01 | 3.88252E+01 |
| A5 | −3.07846E+03 | 5.30169E+02 | 1.26930E+02 | −2.11473E+02 |
| A6 | 2.01749E+04 | −1.72596E+04 | −1.07608E+04 | 5.09987E+02 |
| A7 | −4.36947E−04 | 1.17457E+05 | 1.02606E+05 | 1.09948E+02 |
| A8 | −1.49610E+05 | −1.63872E+05 | −3.87086E+05 | −3.52361E+03 |
| A9 | 6.26111E+05 | −9.28259E+05 | 4.44149E+05 | 6.99639E+03 |
| A10 | 8.57648E+05 | −9.75360E+04 | −8.06032E+05 | −3.84886E+03 |
| A11 | −1.93290E+05 | 1.34794E+07 | 6.47926E+06 | 4.38275E+03 |
| A12 | −1.68535E+07 | 3.65337E+07 | 1.56871E+07 | −1.97058E+04 |
| A13 | −5.09241E+07 | −1.13880E+08 | 6.69226E+07 | 7.08100E+03 |
| A14 | 1.53099E+08 | −9.15487E+08 | −4.09061E+08 | 2.79985E+04 |
| A15 | 3.91862E+08 | −3.66549E+08 | −3.21596E+07 | 1.43276E+04 |
| A16 | 1.09029E+09 | 1.98575E+10 | 8.79181E+09 | −5.56144E+04 |
| A17 | −5.63519E+09 | −3.65926E+10 | −1.62961E+10 | 7.10840E+03 |

Numerical Examples 2 to 11

As in Numerical Example 1 described above, specific lens data corresponding to the configuration of image pickup lens in FIG. 2 are shown in [Table 3] and [Table 4] as Numerical Example 2. Likewise, specific lens data corresponding to the configurations of image pickup lenses in FIGS. 3 to 11 are shown in [Table 5] to [Table 22]. As in Numerical Example 1, each of first lens G1 and second lens G2 has an aspherical shape on each side in Examples 2 to 11.

The effective radii and aperture radii in the lens data of Numerical Examples 2 to 11 are design values. With respect to Numerical Examples 2 to 7 and 9 to 11, it is preferable that the image height is 0.88 (mm) in manufacturing from the viewpoint of image resolution. With respect to Numerical Example 8, it is preferable that the image height is 0.629 (mm) in manufacturing from the viewpoint of image resolution.

TABLE 3

EXAMPLE 2 • BASIC LENS DATA

| S i (SURFACE NUMBER) | R i (RADIUS OF CURVATURE) | Di (SURFACE DISTANCE) | Nd j (REFRACTIVE INDEX) | ν d j (ABBE NUMBER) | Yi (EFFECTIVE RADIUS, APERTURE RADIUS) |
|---|---|---|---|---|---|
| 1 (APERTURE STOP) | — | −0.08 | | | 0.243 |
| 2 | 0.366 | 0.29 | 1.545 | 55.6 | 0.250 |
| 3 | 0.444 | 0.07 | | | 0.229 |
| 4 (FIELD STOP) | — | 0.09 | | | 0.235 |
| 5 | −1.960 | 0.48 | 1.545 | 55.6 | 0.272 |
| 6 | −0.920 | 0.51 | | | 0.511 |
| 7 | ∞ | 0.25 | 1.5168 | 64.2 | |
| 8 | ∞ | 0.00 | | | |
| 9 (IMAGE PLANE) | ∞ | | | | 0.980 |

TABLE 4

EXAMPLE 2 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 1.25760E+00 | 1.63520E+00 | 0.00000E+00 | 1.88296E+00 |
| A3 | −9.08471E+00 | −1.22238E+01 | −4.20330E+00 | −3.77997E−01 |
| A4 | 2.56887E+02 | 1.67744E+02 | 4.41579E+01 | 8.57018E+00 |
| A5 | −3.32785E+03 | −1.62979E+02 | −2.79255E+02 | −7.93193E+01 |
| A6 | 2.06630E+04 | −1.58065E+04 | 5.90399E+02 | 2.86822E+02 |
| A7 | −4.15820E+04 | 1.29624E+05 | 1.77825E+03 | 3.48269E+01 |
| A8 | −1.47950E+05 | −1.92247E+05 | −5.39745E+03 | −3.14772E+03 |
| A9 | 6.01116E+05 | −1.14555E+06 | −3.39275E+04 | 7.48337E+03 |
| A10 | 6.40471E+05 | −1.58896E+05 | −1.60701E+04 | −3.99861E+03 |
| A11 | −4.83161E+05 | 1.66417E+07 | 3.68251E+05 | 3.01293E+03 |
| A12 | −1.28806E+07 | 4.56164E+07 | 1.66983E+06 | −2.20538E+04 |
| A13 | −3.75785E+07 | −1.19363E+08 | 2.32030E+06 | 6.01686E+03 |
| A14 | 1.67676E+08 | −1.11275E+09 | −1.40466E+07 | 2.87348E+04 |
| A15 | 1.79918E+08 | −9.13425E+08 | −9.51897E+07 | 3.65889E+04 |
| A16 | −1.79718E+08 | 2.38397E+10 | −3.22301E+08 | −2.78735E+04 |
| A17 | −1.40838E+09 | −4.05419E+10 | 1.75448E+09 | −6.86476E+04 |

TABLE 5

EXAMPLE 3 • BASIC LENS DATA

| S i (SURFACE NUMBER) | R i (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
|---|---|---|---|---|---|
| 1 (APERTURE STOP) | — | −0.08 | | | 0.243 |
| 2 | 0.359 | 0.28 | 1.545 | 55.6 | 0.249 |
| 3 | 0.387 | 0.08 | | | 0.227 |
| 4 (FIELD STOP) | — | 0.08 | | | 0.237 |
| 5 | −33.682 | 0.47 | 1.545 | 55.6 | 0.266 |
| 6 | −1.214 | 0.53 | | | 0.520 |
| 7 | ∞ | 0.25 | 1.5168 | 64.2 | |
| 8 | ∞ | 0.00 | | | |
| 9 (IMAGE PLANE) | ∞ | | | | 0.980 |

TABLE 6

EXAMPLE 3 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 0.00000E+00 | 0.00000E+00 | 0.00000E+00 | 0.00000E+00 |
| A3 | −1.19083E+01 | −2.00729E+01 | −1.39000E+01 | −2.56436E+00 |
| A4 | 3.22205E+02 | 3.13999E+02 | 2.96162E+02 | 3.57017E+01 |
| A5 | −3.82842E+03 | −1.19205E+03 | −3.71206E+03 | −2.40691E+02 |
| A6 | 2.09549E+04 | −1.38465E+04 | 2.43103E+04 | 7.75396E+02 |
| A7 | −2.76551E+04 | 1.12041E+05 | −5.84951E+04 | −7.94048E+02 |
| A8 | −1.44616E+05 | 1.00538E+05 | −1.22562E+05 | −1.39706E+03 |
| A9 | 2.35660E+04 | −1.56415E+06 | 3.61428E+05 | 1.39045E+03 |
| A10 | 1.84334E+06 | −5.18388E+06 | 2.46513E+06 | 5.61390E+03 |
| A11 | 3.36344E+06 | 4.67128E+06 | 8.01825E+05 | 3.04447E+03 |
| A12 | −4.58599E+06 | 1.08906E+08 | −3.06438E+07 | −1.28478E+04 |
| A13 | −7.15658E+07 | 4.01448E+08 | −9.17167E+07 | −3.57442E+04 |
| A14 | −2.06901E+08 | 1.25102E+08 | 6.47235E+07 | −3.07417E+04 |
| A15 | 1.36447E+08 | −6.79094E+09 | 1.03315E+09 | 8.50282E+04 |
| A16 | 2.90364E+09 | −3.88454E+10 | 4.46196E+09 | 2.71380E+05 |
| A17 | 1.46135E+10 | −5.21210E+10 | 3.21803E+09 | 3.21700E+05 |
| A18 | −1.55685E+10 | 5.43429E+11 | −5.39994E+10 | −6.89288E+05 |
| A19 | −2.62353E+11 | 3.54713E+12 | −2.68665E+11 | −2.68892E+06 |
| A20 | 4.83477E+11 | −1.13213E+13 | 8.29557E+11 | 3.46926E+06 |

TABLE 7

EXAMPLE 4 • BASIC LENS DATA

| S i (SURFACE NUMBER) | R i (RADIUS OF CURVATURE) | D i (SURFACE DISTANCE) | N d j (REFRACTIVE INDEX) | ν d j (ABBE NUMBER) | Y i (EFFECTIVE RADIUS, APERTURE RADIUS) |
|---|---|---|---|---|---|
| 1 (APERTURE STOP) | — | −0.08 | | | 0.243 |
| 2 | 0.347 | 0.27 | 1.5311 | 55.3 | 0.268 |
| 3 | 0.704 | 0.09 | | | 0.223 |
| 4 (FIELD STOP) | — | 0.09 | | | 0.240 |
| 5 | −0.484 | 0.44 | 1.5401 | 55.3 | 0.268 |
| 6 | −0.660 | 0.48 | | | 0.508 |
| 7 | ∞ | 0.21 | 1.5168 | 64.2 | |
| 8 | ∞ | 0.00 | | | |
| 9 (IMAGE PLANE) | ∞ | | | | 0.980 |

TABLE 8

EXAMPLE 4 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 0.00000E+00 | 0.00000E+00 | 0.00000E+00 | 0.00000E+00 |
| A3 | −4.19724E+00 | 9.27307E+00 | 2.65888E+01 | 6.68678E+00 |
| A4 | 9.76038E+01 | −2.47817E+02 | −4.84340E+02 | −5.07869E+01 |
| A5 | −1.02217E+03 | 3.14978E+03 | 4.56360E+03 | 1.50803E+02 |
| A6 | 4.94645E+03 | −1.61266E+04 | −2.13397E+04 | −4.92021E+01 |
| A7 | −4.20813E+03 | −7.12952E+02 | 2.31111E+04 | −3.85651E+02 |
| A8 | −3.25141E+04 | 1.91432E+05 | 1.46615E+05 | −6.10288E+02 |
| A9 | −1.16270E+04 | 3.66592E+05 | −1.23704E+05 | 1.36731E+03 |
| A10 | 1.92060E+05 | −1.55832E+06 | −1.44074E+06 | 4.95024E+03 |
| A11 | 1.27631E+06 | −1.07838E+07 | −1.93150E+06 | 3.06875E+03 |
| A12 | 6.70503E+05 | −2.18491E+07 | 8.78642E+06 | −1.53784E+04 |
| A13 | −1.47226E+07 | 5.59481E+07 | 4.34595E+07 | −4.78373E+04 |
| A14 | −4.30650E+07 | 6.30336E+08 | 6.86236E+07 | −3.55211E+04 |
| A15 | −1.77736E+07 | 2.35210E+09 | −2.33010E+08 | 1.14042E+05 |
| A16 | 7.42720E+08 | 1.18712E+09 | −1.67877E+09 | 4.25843E+05 |
| A17 | 1.67167E+09 | −3.01562E+10 | −3.47684E+09 | 4.73770E+05 |
| A18 | −4.67366E+09 | −1.70536E+11 | 9.23833E+09 | −1.10681E+06 |
| A19 | −3.42450E+10 | −2.45544E+11 | 7.60517E+10 | −4.51055E+06 |
| A20 | 8.34073E+10 | 2.56629E+12 | −1.36669E+11 | 6.02556E+06 |

TABLE 9

EXAMPLE 5 • BASIC LENS DATA

| S i (SURFACE NUMBER) | R i (RADIUS OF CURVATURE) | D i (SURFACE DISTANCE) | N d j (REFRACTIVE INDEX) | ν d j (ABBE NUMBER) | Y i (EFFECTIVE RADIUS, APERTURE RADIUS) |
|---|---|---|---|---|---|
| 1 (APERTURE STOP) | — | −0.08 | | | 0.243 |
| 2 | 0.358 | 0.30 | 1.545 | 56.0 | 0.255 |
| 3 | 0.632 | 0.08 | | | 0.225 |
| 4 (FIELD STOP) | — | 0.08 | | | 0.240 |
| 5 | −0.666 | 0.44 | 1.545 | 56.0 | 0.261 |
| 6 | −0.799 | 0.48 | | | 0.500 |
| 7 | ∞ | 0.15 | 1.5168 | 64.2 | |
| 8 | ∞ | 0.03 | | | |
| 9 (IMAGE PLANE) | ∞ | | | | 0.930 |

TABLE 10

EXAMPLE 5 • ASPHERICAL SURFACE DATA

| ASPHERICAL COEFFICIENT | SURFACE NUMBER | | | |
| --- | --- | --- | --- | --- |
| | SECOND SURFACE | THIRD SURFACE | FIFTH SURFACE | SIXTH SURFACE |
| K | 0.00000E+00 | 0.00000E+00 | 0.00000E+00 | 0.00000E+00 |
| A3 | −3.81217E+00 | 4.12544E+00 | 1.75043E+01 | 3.78682E+00 |
| A4 | 1.06981E+02 | −1.47832E+02 | −4.09823E+02 | −3.35641E−01 |
| A5 | −1.42198E+03 | 2.37011E+03 | 5.10105E+03 | 1.35349E−02 |
| A6 | 9.35405E+03 | −1.60255E+04 | −3.39011E+04 | −2.57489E+02 |
| A7 | −1.92243E+04 | 2.26026E+04 | 8.39734E+04 | 3.80745E+02 |
| A8 | −6.09953E+04 | 1.77011E+05 | 1.93361E+05 | −1.46371E+03 |
| A9 | 1.07788E+05 | −3.87570E+05 | −8.20578E+05 | 1.17105E+03 |
| A10 | 8.92221E+05 | −2.16406E+06 | −2.88740E+06 | 5.93434E+03 |
| A11 | 1.13349E+06 | −8.55118E+06 | 2.23144E+06 | 5.35442E+03 |
| A12 | −5.81029E+06 | −9.02583E+06 | 3.51033E+07 | −1.77391E+04 |
| A13 | −3.95035E+07 | 2.10929E+08 | 1.03244E+08 | −6.78693E+04 |
| A14 | −6.72396E+07 | 5.88891E+08 | −3.33972E+07 | −6.62301E+04 |
| A15 | 2.03634E+08 | 6.54634E+08 | −1.46177E+09 | 1.63025E+05 |
| A16 | 1.91085E+09 | −1.12028E+10 | −5.24439E+09 | 7.44001E+05 |
| A17 | 3.88160E+09 | −4.62362E+10 | −5.52683E+09 | 7.73390E+05 |
| A18 | −8.72461E+09 | 1.91176E+10 | 6.78486E+10 | −1.94088E+06 |
| A19 | −1.25076E+11 | 7.83690E+11 | 3.11955E+11 | −8.06896E+06 |
| A20 | 2.60228E+11 | −9.88792E+11 | −9.15992E+11 | 1.11102E+07 |

TABLE 11

EXAMPLE 6 • BASIC LENS DATA

| Si (SURFACE NUMBER) | Ri (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
| --- | --- | --- | --- | --- | --- |
| 1 (APERTURE STOP) | — | −0.08 | | | 0.243 |
| 2 | 0.377 | 0.33 | 1.545 | 56.0 | 0.248 |
| 3 | 0.641 | 0.07 | | | 0.236 |
| 4 (FIELD STOP) | — | 0.07 | | | 0.240 |
| 5 | −0.836 | 0.44 | 1.545 | 56.0 | 0.267 |
| 6 | −0.900 | 0.27 | | | 0.502 |
| 7 | ∞ | 0.20 | 1.5168 | 64.2 | |
| 8 | ∞ | 0.21 | | | |
| 9 (IMAGE PLANE) | ∞ | | | | 0.920 |

TABLE 12

EXAMPLE 6 • ASPHERICAL SURFACE DATA

| ASPHERICAL COEFFICIENT | SURFACE NUMBER | | | |
| --- | --- | --- | --- | --- |
| | SECOND SURFACE | THIRD SURFACE | FIFTH SURFACE | SIXTH SURFACE |
| K | 0.00000E+00 | 0.00000E+00 | 0.00000E+00 | 0.00000E+00 |
| A3 | −3.49846E+00 | 3.30641E+00 | 1.50409E+01 | 2.89594E+00 |
| A4 | 9.58432E+01 | −1.16216E+02 | −3.72616E+02 | −2.40246E+01 |
| A5 | −1.26305E+03 | 1.81205E+03 | 4.83346E+03 | 8.84156E+01 |
| A6 | 8.37772E+03 | −1.24307E+04 | −3.28215E+04 | −1.78509E+02 |
| A7 | −1.83764E+04 | 2.28711E+04 | 8.14110E+04 | 5.03505E+02 |
| A8 | −5.21031E+04 | 1.23657E+05 | 1.91939E+05 | −1.73716E+03 |
| A9 | 1.18044E+05 | −1.80746E+05 | −7.82904E+05 | 4.77447E+02 |
| A10 | 8.30451E+05 | −1.78232E+06 | −2.83454E+06 | 5.53436E+03 |
| A11 | 7.78670E+05 | −4.27734E+06 | 1.83700E+06 | 8.53747E+03 |
| A12 | −6.63234E+06 | 4.48985E+06 | 3.30776E+07 | −1.08587E+04 |
| A13 | −3.92130E+07 | 2.00404E+08 | 1.00076E+08 | −6.44689E+04 |
| A14 | −5.52777E+07 | 3.38462E+08 | −1.74215E+07 | −8.54330E+04 |
| A15 | 2.73559E+08 | −7.34181E+08 | −1.35598E+09 | 1.01924E+05 |
| A16 | 2.06464E+09 | −1.47084E+10 | −4.93302E+09 | 6.65426E+05 |
| A17 | 3.71347E+09 | −3.85391E+10 | −5.53663E+09 | 8.43627E+05 |
| A18 | −1.21950E+10 | 1.51471E+11 | 6.31349E+10 | −1.43439E+06 |
| A19 | −1.37466E+11 | 1.27358E+12 | 2.93177E+11 | −7.22877E+06 |
| A20 | 3.04341E+11 | −3.49605E+12 | −8.64851E+11 | 9.14494E+06 |

TABLE 13

EXAMPLE 7 • BASIC LENS DATA

| S i (SURFACE NUMBER) | R i (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
|---|---|---|---|---|---|
| 1 (APERTURE STOP) | — | −0.09 | | | 0.242 |
| 2 | 0.387 | 0.27 | 1.5247 | 56.2 | 0.256 |
| 3 | 0.543 | 0.09 | | | 0.227 |
| 4 (FIELD STOP) | — | 0.06 | | | 0.256 |
| 5 | −1.135 | 0.36 | 1.5247 | 56.2 | 0.271 |
| 6 | −0.780 | 0.33 | | | 0.441 |
| 7 | ∞ | 0.21 | 1.5168 | 64.2 | |
| 8 | ∞ | 0.32 | | | |
| 9 (IMAGE PLANE) | ∞ | | | | 0.920 |

TABLE 14

EXAMPLE 7 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 7.16975E−01 | −1.54456E+00 | −1.26000E+01 | 9.49433E−01 |
| A3 | 1.51890E−01 | 3.61466E−01 | 8.42571E−01 | 0.00000E+00 |
| A4 | 2.21393E−01 | −3.73444E+00 | −1.93704E+01 | 4.41655E−01 |
| A5 | −2.19617E+00 | 8.90885E+01 | 1.28029E+02 | −4.23173E+00 |
| A6 | 7.93667E+01 | −3.42518E+02 | −2.72315E+02 | 1.24201E+01 |
| A7 | −6.92594E+01 | −6.89986E+01 | −1.32970E+03 | −4.98775E+01 |
| A8 | −9.86154E+02 | 3.75701E+03 | 8.66601E+02 | −2.36040E+01 |
| A9 | −1.75811E+03 | 8.68158E+03 | 1.81798E+04 | 1.92301E+02 |
| A10 | 4.46669E+03 | −1.83543E+04 | 4.48341E+04 | 3.95118E+02 |
| A11 | 3.93854E+04 | −1.58770E+05 | −9.93818E+04 | 1.43865E+02 |
| A12 | 1.51477E+05 | −4.34786E+05 | −8.59330E+05 | −1.72815E+03 |
| A13 | 3.28409E+05 | 3.03016E+05 | −7.79904E+05 | −5.81125E+03 |
| A14 | −1.36354E+05 | 6.60232E+06 | 3.24211E+06 | −1.18423E+04 |
| A15 | −5.27331E+06 | 1.88333E+07 | 9.35244E+06 | −9.13871E+03 |
| A16 | −3.07935E+07 | 1.26933E+07 | 1.49712E+07 | 4.52532E+04 |
| A17 | −1.19899E+08 | −6.08365E+07 | 1.87944E+07 | 2.09909E+05 |
| A18 | −2.77498E+08 | 5.57845E+06 | 2.02763E+07 | 4.04367E+05 |
| A19 | 4.04959E+08 | 2.09723E+09 | 1.94667E+07 | 6.94114E+04 |
| A20 | 1.02651E+10 | −4.61507E+09 | 1.48937E+07 | −3.09132E+06 |

TABLE 15

EXAMPLE 8 • BASIC LENS DATA

| S i (SURFACE NUMBER) | R i (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
|---|---|---|---|---|---|
| 1 (APERTURE STOP) | — | −0.09 | | | 0.175 |
| 2 | 0.234 | 0.18 | 1.5247 | 56.2 | 0.175 |
| 3 | 0.355 | 0.04 | | | 0.131 |
| 4 (FIELD STOP) | — | 0.04 | | | 0.131 |
| 5 | −0.389 | 0.39 | 1.5247 | 56.2 | 0.134 |
| 6 | −0.414 | 0.24 | | | 0.335 |
| 7 | ∞ | 0.15 | 1.5168 | 64.2 | |
| 8 | ∞ | 0.18 | | | |
| 9 (IMAGE PLANE) | ∞ | | | | 0.657 |

TABLE 16

EXAMPLE 8 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | −2.11886E+00 | −1.19192E+01 | −2.72841E+00 | −5.97007E+00 |
| A3 | −3.46751E+00 | −3.49662E+00 | 4.03573E+00 | −2.34796E+00 |
| A4 | 1.58750E+02 | 1.51713E+02 | −1.46961E+02 | 5.03352E+01 |
| A5 | −2.02957E+03 | −1.32885E+03 | 1.88633E+03 | −5.25495E+02 |
| A6 | 1.57496E+04 | 2.65223E+03 | −1.61341E+04 | 1.27427E+03 |
| A7 | −4.25268E+04 | 3.87062E+04 | 4.49791E+04 | 3.69942E+03 |
| A8 | −1.69782E+05 | 2.93840E+04 | 2.03831E+05 | −2.74029E+03 |
| A9 | 7.42260E+06 | −1.12282E+06 | −7.84364E+05 | −7.03802E+04 |
| A10 | 5.08602E+06 | −7.89668E+06 | −5.72266E+06 | −1.08934E+05 |
| A11 | −1.95959E+06 | −1.31636E+07 | −5.30396E+06 | 4.89498E+05 |
| A12 | −1.41269E+08 | 2.03919E+08 | 6.57788E+07 | 2.14168E+06 |
| A13 | −6.64229E+08 | 2.15955E+09 | −1.32805E+08 | 2.30213E+06 |
| A14 | 2.44285E+08 | 7.68509E+09 | −1.20067E+10 | −6.16119E+06 |
| A15 | 2.33270E+10 | −5.85277E+10 | −1.61684E+11 | −5.20449E+07 |
| A16 | 1.41693E+11 | −5.37557E+11 | −1.80821E+11 | −1.73051E+08 |
| A17 | 2.30416E+11 | 1.57616E+13 | 4.33113E+13 | −1.07411E+08 |
| A18 | −6.60171E+12 | 3.24908E+14 | 9.27815E+14 | 1.79633E+09 |
| A19 | −1.27185E+13 | −7.09618E+15 | −1.62007E+16 | 7.73732E+09 |
| A20 | 1.04348E+14 | 2.99234E+16 | 5.79365E+16 | −2.05026E+10 |

TABLE 17

EXAMPLE 9 • BASIC LENS DATA

| Si (SURFACE NUMBER) | Ri (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
|---|---|---|---|---|---|
| 1 (APERTURE STOP) | — | −0.10 | | | 0.239 |
| 2 | 0.348 | 0.27 | 1.5247 | 56.2 | 0.241 |
| 3 | 0.537 | 0.07 | | | 0.205 |
| 4 (FIELD STOP) | — | 0.06 | | | 0.213 |
| 5 | −0.703 | 0.45 | 1.5247 | 56.2 | 0.218 |
| 6 | −0.715 | 0.33 | | | 0.466 |
| 7 | ∞ | 0.21 | 1.5168 | 64.2 | |
| 8 | ∞ | 0.25 | | | |
| 9 (IMAGE PLANE) | ∞ | | | | 0.920 |

TABLE 18

EXAMPLE 9 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | −5.54255E−01 | −8.91776E+00 | −6.63968E+00 | −1.25927E+01 |
| A3 | −2.47146E+00 | −2.71548E+00 | 2.37417E+00 | −1.12930E+00 |
| A4 | 5.97449E+01 | 5.89990E+01 | −5.19764E+02 | 1.90616E+01 |
| A5 | −5.80724E+02 | −3.62248E+02 | 4.80691E+02 | −1.44692E+02 |
| A6 | 3.12515E+03 | 4.39638E+02 | −3.11955E+03 | 2.65922E+02 |
| A7 | −6.00292E+03 | 5.21039E+03 | 7.67236E+03 | 5.32762E+02 |
| A8 | −1.71912E+04 | 2.68567E+03 | 2.26607E+04 | −2.94527E+02 |
| A9 | 5.72386E+04 | −8.23111E+04 | −7.59989E+04 | −5.32370E+03 |
| A10 | 2.78526E+05 | −4.19909E+05 | −4.08213E+05 | −5.92228E+03 |
| A11 | −8.96487E+04 | −4.89356E+05 | −3.50954E+05 | 1.95165E+04 |
| A12 | −4.12639E+06 | 6.22857E+06 | 3.49722E+06 | 6.15433E+04 |
| A13 | −1.40998E+07 | 5.36058E+08 | 1.89509E+07 | 4.74730E+04 |
| A14 | 2.65757E+06 | 2.43781E+08 | 2.86120E+07 | −9.39845E+04 |
| A15 | 2.51656E+08 | 5.07748E+08 | −1.96722E+08 | −5.68918E+05 |
| A16 | 1.12036E+09 | −3.82406E+09 | −1.43426E+09 | −1.36689E+06 |
| A17 | 1.41380E+09 | −8.18127E+10 | 3.15106E+09 | −6.10986E+05 |
| A18 | −2.69519E+10 | −6.74255E+11 | 1.39709E+11 | 7.45637E+06 |
| A19 | −4.62304E+10 | 7.55568E+12 | −8.91369E+11 | 2.32479E+07 |
| A20 | 2.50998E+11 | −1.54223E+13 | 1.31191E+12 | −4.45957E+07 |

TABLE 19

EXAMPLE 10 • BASIC LENS DATA

| Si (SURFACE NUMBER) | Ri (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
|---|---|---|---|---|---|
| 1 (APERTURE STOP) | — | −0.10 | | | 0.235 |
| 2 | 0.372 | 0.33 | 1.5311 | 55.4 | 0.244 |
| 3 | 0.648 | 0.07 | | | 0.212 |
| 4 (FIELD STOP) | — | 0.07 | | | 0.218 |
| 5 | −0.780 | 0.44 | 1.5311 | 55.4 | 0.247 |
| 6 | −0.880 | 0.48 | | | 0.489 |
| 7 | ∞ | 0.21 | 1.5168 | 64.2 | |
| 8 | ∞ | 0.00 | | | |
| 9 (IMAGE PLANE) | ∞ | | | | 0.930 |

TABLE 20

EXAMPLE 10 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 0.00000E+00 | 0.00000E+00 | 0.00000E+00 | 0.00000E+00 |
| A3 | −3.18676E+00 | 3.43105E+00 | 1.40673E+01 | 2.36291E+00 |
| A4 | 7.79713E+01 | −1.26203E+02 | −3.16729E+02 | −1.09136E+01 |
| A5 | −9.81084E+02 | 2.23671E+03 | 3.91708E+03 | −4.00602E+01 |
| A6 | 7.35706E+03 | −2.10394E+04 | −2.90847E+04 | 5.31576E+02 |
| A7 | −3.16177E+04 | 1.12395E+05 | 1.26236E+05 | −1.98859E+03 |
| A8 | 7.25370E+04 | −3.20455E+05 | −2.95670E+05 | 3.31169E+03 |
| A9 | −6.84254E+04 | 3.82605E+05 | 2.86951E+05 | −2.12701E+03 |

TABLE 21

EXAMPLE 11 • BASIC LENS DATA

| Si (SURFACE NUMBER) | Ri (RADIUS OF CURVATURE) | Di (SURFACE DISTANCE) | Ndj (REFRACTIVE INDEX) | νdj (ABBE NUMBER) | Yi (EFFECTIVE RADIUS, APERTURE RADIUS) |
|---|---|---|---|---|---|
| 1 (APERTURE STOP) | — | −0.09 | | | 0.235 |
| 2 | 0.377 | 0.33 | 1.5339 | 56.0 | 0.238 |
| 3 | 0.641 | 0.08 | | | 0.211 |
| 4 (FIELD STOP) | — | 0.06 | | | 0.225 |
| 5 | −0.836 | 0.44 | 1.5339 | 56.0 | 0.251 |
| 6 | −0.900 | 0.25 | | | 0.502 |
| 7 | ∞ | 0.21 | 1.5168 | 64.2 | |
| 8 | ∞ | 0.22 | | | |
| 9 (IMAGE PLANE) | ∞ | | | | 0.980 |

TABLE 22

EXAMPLE 11 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| K | 0.00000E+00 | 0.00000E+00 | 0.00000E+00 | 0.00000E+00 |
| A3 | −3.49846E+00 | 3.30641E+00 | 1.50409E+01 | 2.89594E+00 |
| A4 | 9.58432E+01 | −1.16216E+02 | −3.72616E+02 | −2.40246E+01 |
| A5 | −1.26305E+03 | 1.81205E+03 | 4.83346E+03 | 8.84156E+01 |
| A6 | 8.37772E+03 | −1.24307E+04 | −3.28215E+04 | −1.78509E+02 |
| A7 | −1.83764E+04 | 2.28711E+04 | 8.14110E+04 | 5.03505E+02 |
| A8 | −5.21031E+04 | 1.23657E+05 | 1.91939E+05 | −1.73716E+03 |
| A9 | 1.18044E+05 | −1.80746E+05 | −7.82904E+05 | 4.77447E+02 |
| A10 | 8.30451E+05 | −1.78232E+06 | −2.83454E+06 | 5.53436E+03 |
| A11 | 7.78670E+05 | −4.27734E+06 | 1.83700E+06 | 8.53747E+03 |
| A12 | −6.63234E+06 | 4.48985E+06 | 3.30776E+07 | −1.08587E+04 |
| A13 | −3.92130E+07 | 2.00404E+08 | 1.00076E+08 | −6.44689E+04 |
| A14 | −5.52777E+07 | 3.38462E+08 | −1.74215E+07 | −8.54330E+04 |
| A15 | 2.73559E+08 | −7.34181E+08 | −1.35598E+09 | 1.01924E+05 |

TABLE 22-continued

EXAMPLE 11 • ASPHERICAL SURFACE DATA

| ASPHERICAL COEFFICIENT | SURFACE NUMBER | | | |
|---|---|---|---|---|
| | SECOND SURFACE | THIRD SURFACE | FIFTH SURFACE | SIXTH SURFACE |
| A16 | 2.06464E+09 | −1.47084E+10 | −4.93302E+09 | 6.65426E+05 |
| A17 | 3.71347E+09 | −3.85391E+10 | −5.53663E+09 | 8.43627E+05 |
| A18 | −1.21950E+10 | 1.51471E+11 | 6.31349E+10 | −1.43439E+06 |
| A19 | −1.37466E+11 | 1.27368E+12 | 2.93177E+11 | −7.22877E+06 |
| A20 | 3.04341E+11 | −3.49605E+12 | −8.64851E+11 | 9.14494E+06 |

[Correspondence Relationship Between Each Example and Configuration Group]

With respect to each of numerical examples, [Table 23] and [Table 24] show correspondence relationship between each of first to eighth combination examples (configuration groups) of conditional expressions and a value of each of the conditional expressions. In [Table 25], the mark "○" indicates that the marked example satisfies prerequisite conditions (all conditional expressions other than a preferable conditional expression) of the marked configuration group. For example, numerical examples that satisfy Configuration Group (A-1) are Numerical Examples 2 and 7.

TABLE 23

| CONFIGURATION GROUP | CONDITIONAL EXPRESSION | EXPRESSION NUMBER | EXAMPLE | | | | | |
|---|---|---|---|---|---|---|---|---|
| | | | 1 | 2 | 3 | 4 | 5 | 6 |
| (A-1) | f1/f | (1-1) | 1.113 | 1.192 | 1.424 | 0.745 | 0.820 | 0.872 |
| | f2/f1 | (2-1) | 2.842 | 1.659 | 1.149 | −26.116 | 40.623 | 12.934 |
| | (R5 + R6)/(R5 − R6) | (3-1) | 2.419 | 2.769 | 1.075 | −6.479 | −10.985 | −27.213 |
| (A-2) | (R5 + R6)/(R5 − R6) | (3-1) | 2.419 | 2.769 | 1.075 | −6.479 | −10.985 | −27.213 |
| | (R2 + R3)/(R2 − R3) | (4-1) | −7.453 | −10.308 | −26.077 | −2.942 | −3.610 | −3.865 |
| | R2/R3 | (5-1) | 0.763 | 0.823 | 0.926 | 0.493 | 0.566 | 0.589 |
| | Nd1 | (6) | 1.544 | 1.545 | 1.545 | 1.531 | 1.545 | 1.545 |
| (B) | (R5 + R6)/(R5 − R6) | (3-2) | 2.419 | 2.769 | 1.075 | −6.479 | −10.985 | −27.213 |
| | (R2 + R3)/(R2 − R3) | (4-2) | −7.453 | −10.308 | −26.077 | −2.942 | −3.610 | −3.865 |
| (C-1) | Da/f | (7) | 0.651 | 0.672 | 0.648 | 0.644 | 0.668 | 0.679 |
| | TL/f | (8) | 1.116 | 1.161 | 1.144 | 1.104 | 1.105 | 1.113 |
| | DD/f | (9-2) | 0.112 | 0.116 | 0.114 | 0.126 | 0.117 | 0.104 |
| (C-2) | f2/f1 | (2-2) | 2.842 | 1.659 | 1.149 | −26.116 | 40.623 | 12.934 |
| | Da/f | (7) | 0.651 | 0.672 | 0.648 | 0.644 | 0.668 | 0.679 |
| | DD/f | (9-2) | 0.112 | 0.116 | 0.114 | 0.126 | 0.117 | 0.104 |
| (C-3) | f1/f | (1-2) | 1.113 | 1.192 | 1.424 | 0.745 | 0.820 | 0.872 |
| | DD/f | (9-1) | 0.112 | 0.116 | 0.114 | 0.126 | 0.117 | 0.104 |
| | f2/f | (10-1) | 3.164 | 1.977 | 1.637 | −19.449 | 33.295 | 11.275 |
| (D-1) | DD/f | (9-2) | 0.112 | 0.116 | 0.114 | 0.126 | 0.117 | 0.104 |
| | R5/R6 | (11) | 2.410 | 2.130 | 27.756 | 0.733 | 0.833 | 0.929 |
| (D-2) | R2/R3 | (5-2) | 0.763 | 0.823 | 0.926 | 0.493 | 0.566 | 0.589 |
| | DD/f | (9-2) | 0.112 | 0.116 | 0.114 | 0.126 | 0.117 | 0.104 |

| CONFIGURATION GROUP | CONDITIONAL EXPRESSION | EXPRESSION NUMBER | EXAMPLE | | | | |
|---|---|---|---|---|---|---|---|
| | | | 7 | 8 | 9 | 10 | 11 |
| (A-1) | f1/f | (1-1) | 1.149 | 0.872 | 0.901 | 0.854 | 0.874 |
| | f2/f1 | (2-1) | 2.177 | 3.261 | 5.392 | 20.785 | 13.176 |
| | (R5 + R6)/(R5 − R6) | (3-1) | 5.392 | −32.120 | −120.186 | −16.700 | −27.213 |
| (A-2) | (R5 + R6)/(R5 − R6) | (3-1) | 5.392 | −32.120 | −120.186 | −16.700 | −27.213 |
| | (R2 + R3)/(R2 − R3) | (4-1) | −5.991 | −4.868 | −4.677 | −3.697 | −3.865 |
| | R2/R3 | (5-1) | 0.714 | 0.659 | 0.648 | 0.574 | 0.589 |
| | Nd1 | (6) | 1.525 | 1.525 | 1.525 | 1.531 | 1.534 |
| (B) | (R5 + R6)/(R5 − R6) | (3-2) | 5.392 | −32.120 | −120.186 | −16.700 | −27.213 |
| | (R2 + R3)/(R2 − R3) | (4-2) | −5.991 | −4.868 | −4.677 | −3.697 | −3.865 |
| (C-1) | Da/f | (7) | 0.552 | 0.660 | 0.613 | 0.662 | 0.664 |
| | TL/f | (8) | 1.147 | 1.223 | 1.138 | 1.106 | 1.109 |
| | DD/f | (9-2) | 0.110 | 0.081 | 0.095 | 0.102 | 0.102 |
| (C-2) | f2/f1 | (2-2) | 2.177 | 3.261 | 5.392 | 20.785 | 13.176 |
| | Da/f | (7) | 0.552 | 0.660 | 0.613 | 0.662 | 0.664 |
| | DD/f | (9-2) | 0.110 | 0.081 | 0.095 | 0.102 | 0.102 |
| (C-3) | f1/f | (1-2) | 1.149 | 0.872 | 0.901 | 0.854 | 0.874 |
| | DD/f | (9-1) | 0.110 | 0.081 | 0.095 | 0.102 | 0.102 |
| | f2/f | (10-1) | 2.500 | 2.843 | 4.856 | 17.757 | 11.513 |
| (D-1) | DD/f | (9-2) | 0.110 | 0.081 | 0.095 | 0.102 | 0.102 |
| | R5/R6 | (11) | 1.455 | 0.940 | 0.983 | 0.887 | 0.929 |
| (D-2) | R2/R3 | (5-2) | 0.714 | 0.659 | 0.648 | 0.574 | 0.589 |
| | DD/f | (9-2) | 0.110 | 0.081 | 0.095 | 0.102 | 0.102 |

TABLE 24

PREFERABLE CONDITION

| CONFIGU-RATION GROUP | CONDI-TIONAL EXPRES-SION | EXPRES-SION NUMBER | EXAMPLE | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| (C-1) | f2/f1 | (2-2) | 2.842 | 1.659 | 1.149 | −26.116 | 40.623 | 12.934 | 2.177 | 3.261 | 5.392 | 20.785 | 13.176 |
| | f1/f | (1-2) | 1.113 | 1.192 | 1.424 | 0.745 | 0.820 | 0.872 | 1.149 | 0.872 | 0.901 | 0.854 | 0.874 |
| | f2/f | (10-1) | 3.164 | 1.977 | 1.637 | −19.449 | 33.295 | 11.275 | 2.500 | 2.843 | 4.856 | 17.757 | 11.513 |
| (D-2) | R5/R6 | (11) | 2.410 | 2.130 | 27.756 | 0.733 | 0.833 | 0.929 | 1.455 | 0.940 | 0.983 | 0.887 | 0.929 |
| (OTHER THAN C-1) | f2/f | (10-2) | 3.164 | 1.977 | 1.637 | −19.449 | 33.295 | 11.275 | 2.500 | 2.843 | 4.856 | 17.757 | 11.513 |
| | f2/f | (10-3) | 3.164 | 1.977 | 1.637 | −19.449 | 33.295 | 11.275 | 2.500 | 2.843 | 4.856 | 17.757 | 11.513 |
| (ALL GROUPS) | (D5 − D2)/f | (12) | 0.133 | 0.137 | 0.135 | 0.124 | 0.108 | 0.082 | 0.064 | 0.210 | 0.123 | 0.084 | 0.080 |
| | (D5 − D2)/f | (12') | 0.133 | 0.137 | 0.135 | 0.124 | 0.108 | 0.082 | 0.064 | 0.210 | 0.123 | 0.084 | 0.080 |
| | (D5 − D2)/f | (12") | 0.133 | 0.137 | 0.135 | 0.124 | 0.108 | 0.082 | 0.064 | 0.210 | 0.123 | 0.084 | 0.080 |
| | R3/f | (13) | 0.350 | 0.321 | 0.276 | 0.514 | 0.473 | 0.478 | 0.385 | 0.359 | 0.386 | 0.474 | 0.468 |
| | R3/f | (13') | 0.350 | 0.321 | 0.276 | 0.514 | 0.473 | 0.478 | 0.385 | 0.359 | 0.386 | 0.474 | 0.468 |
| | \|Nd1 − Nd2\| | (14) | 0.000 | 0.000 | 0.000 | 0.009 | 0.000 | 0.000 | 0.000 | 0.000 | 0.000 | 0.000 | 0.000 |
| | \|vd1 − vd2\| | (15) | 0.000 | 0.000 | 0.000 | 0.000 | 0.000 | 0.000 | 0.000 | 0.000 | 0.000 | 0.000 | 0.000 |
| | Nd1 | (6) | 1.544 | 1.545 | 1.545 | 1.531 | 1.545 | 1.545 | 1.525 | 1.525 | 1.525 | 1.531 | 1.534 |
| | Nd2 | (16) | 1.544 | 1.545 | 1.545 | 1.540 | 1.545 | 1.545 | 1.525 | 1.525 | 1.525 | 1.531 | 1.534 |
| | Da/DD | (17) | 0.172 | 0.172 | 0.176 | 0.195 | 0.176 | 0.154 | 0.199 | 0.123 | 0.156 | 0.155 | 0.154 |
| | Da/DD | (17') | 0.172 | 0.172 | 0.176 | 0.195 | 0.176 | 0.154 | 0.199 | 0.123 | 0.156 | 0.155 | 0.154 |

TABLE 25

CORRESPONDENCE RELATIONSHIP BETWEEN CONFIGURATION GROUP AND EXAMPLE

| EXAMPLE | CONFIGURATION GROUP | | | | | | | |
|---|---|---|---|---|---|---|---|---|
| | (A-1) | (A-2) | (B) | (C-1) | (C-2) | (C-3) | (D-1) | (D-2) |
| 1 | | ○ | | ○ | ○ | | | |
| 2 | ○ | ○ | | ○ | ○ | | | |
| 3 | | | | ○ | ○ | | | |
| 4 | | | ○ | | | | | |
| 5 | | | ○ | ○ | ○ | | ○ | ○ |
| 6 | | | ○ | ○ | ○ | ○ | ○ | ○ |
| 7 | ○ | ○ | | | | | ○ | |
| 8 | | | ○ | ○ | ○ | ○ | ○ | ○ |
| 9 | | | | ○ | ○ | | ○ | ○ |
| 10 | | | ○ | ○ | ○ | | ○ | ○ |
| 11 | | | ○ | ○ | ○ | ○ | ○ | ○ |

(○: CORRESPONDING EXAMPLE)

[Other Data]

Table 26 shows, as other data, values of focal length f (mm) and angle of view of the entire system of each numerical example.

[Aberration Performance]

A to C of FIG. 12 illustrate spherical aberration, astigmatism (field curvature), and distortion of image pickup lens according to Numerical Example 1. Each aberration diagram shows aberrations with respect to e-line (wavelength of 546.07 nm), F-line (wavelength of 486.13 nm), and C-line (wavelength of 656.27 nm) as the reference wavelengths of GBR primary colors. "FNO." represents F-number and "Y" represents image height (mm).

Likewise, aberrations of Numerical Example 2 are shown in A to C of FIG. 13. Aberrations of Numerical Examples 3 to 11 are shown in A to C of FIG. 14 to FIG. 22 in the same manner.

As is clear from the numerical data and aberration diagrams, the total length reduction and high image forming performance are realized in each Example.

It should be appreciated that the present invention is not limited to the embodiments and Examples described above, and various modifications and changes may be made. For example, values of the radius of curvature, surface distance, and refractive index of each lens element are not limited to those shown in each numerical example and may take other values.

TABLE 26

| | EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| f [mm] | 1.43 | 1.38 | 1.40 | 1.37 | 1.34 | 1.34 | 1.41 | 0.99 | 1.39 | 1.37 | 1.37 |
| HALF ANGLE OF VIEW [DEG] | 35.8 | 35.4 | 35.3 | 35.6 | 34.3 | 34.1 | 35.8 | 34.2 | 35.1 | 34.2 | 35.4 |
| TOTAL ANGLE OF VIEW [DEG] | 71.6 | 70.8 | 70.6 | 71.2 | 68.6 | 68.2 | 71.6 | 68.4 | 70.2 | 68.4 | 70.7 |

What is claimed is:

1. An image pickup lens, comprising:
a first lens having a positive meniscus shape convex toward an object side;
a second lens disposed on an image side of the first lens and has a meniscus shape convex toward the image side; and
an aperture stop disposed on the object side of the image side surface of the first lens,
wherein the image pickup lens is configured to satisfy conditional expressions given below:

$$0.45 < R2/R3 < 0.66 \quad (5\text{-}2)$$

$$0.05 < DD/f < 0.117 \quad (9\text{-}2)$$

where,
f is a focal length of the entire lens system;
R2 is a paraxial radius of curvature of the object side surface of the first lens;
R3 is a paraxial radius of curvature of the image side surface of the first lens; and
DD is a distance, on the optical axis, between the first and second lenses.

2. The image pickup lens of claim 1, further satisfying a conditional expression given below:

$$0.45 < R5/R6 < 1.55 \quad (11)$$

where,
R5 is a paraxial radius of curvature of the object side surface of the second lens; and
R6 is a paraxial radius of curvature of the image side surface of the second lens.

3. The image pickup lens of claim 1, wherein the aperture stop is disposed between a surface apex position and an edge position of the object side surface of the first lens.

4. The image pickup lens of claim 1, further comprising a field stop between the first and second lenses.

5. The image pickup lens of claim 1, further satisfying a conditional expression given below:

$$0 < (D5 - D2)/f < 0.23 \quad (12)$$

where,
D2 is a thickness of the first lens on the optical axis; and
D5 is a thickness of the second lens on the optical axis.

6. The image pickup lens of claim 1, wherein the image side surface of the first lens is a concave surface and the image pickup lens further satisfies a conditional expression given below:

$$0.2 < R3/f < 0.52 \quad (13).$$

7. The image pickup lens of claim 1, wherein the second lens has a positive refractive power and the image pickup lens further satisfies a conditional expression given below:

$$0 < f2/f < 100 \quad (10\text{-}2)$$

where, f2 is a focal length of the second lens.

8. The image pickup lens of claim 1, further satisfying a conditional expression given below:

$$|Nd1 - Nd2| \leq 0.01 \quad (14)$$

where,
Nd1 is a refractive index of the first lens with respect to d-line; and
Nd2 is a refractive index of the second lens with respect to d-line.

9. The image pickup lens of claim 1,
further satisfying a conditional expression given below:

$$|vd1 - vd2| < 0.1 \quad (15)$$

where,
vd1 is an Abbe number of the first lens with respect to d-line; and
vd2 is an Abbe number of the second lens with respect to d-line.

10. A portable terminal device, comprising:
an image pickup apparatus having the image pickup lens of claim 1 and an image sensor for outputting an imaging signal according to an optical image formed by the image pickup lens; and
a display unit for displaying an image taken by the image pickup apparatus.

* * * * *